United States Patent
Yerramalli et al.

(10) Patent No.: US 11,109,236 B2
(45) Date of Patent: Aug. 31, 2021

(54) TECHNIQUES FOR CARRIER FEEDBACK IN WIRELESS SYSTEMS

(71) Applicant: QUALCOMM incorporated, San Diego, CA (US)

(72) Inventors: Srinivas Yerramalli, San Diego, CA (US); Rahul Malik, San Diego, CA (US); Kaushik Chakraborty, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 72 days.

(21) Appl. No.: 16/182,527

(22) Filed: Nov. 6, 2018

(65) Prior Publication Data

US 2019/0141539 A1 May 9, 2019

Related U.S. Application Data

(60) Provisional application No. 62/583,708, filed on Nov. 9, 2017.

(51) Int. Cl.
*H04W 16/14* (2009.01)
*H04L 1/00* (2006.01)
(Continued)

(52) U.S. Cl.
CPC ........ *H04W 16/14* (2013.01); *H04L 1/0003* (2013.01); *H04L 1/0006* (2013.01);
(Continued)

(58) Field of Classification Search
None
See application file for complete search history.

(56) References Cited

U.S. PATENT DOCUMENTS

| | | | |
|---|---|---|---|
| 2012/0140649 A1* | 6/2012 | Choudhury | H04L 1/0027 370/252 |
| 2013/0121299 A1* | 5/2013 | Kim | H04L 5/001 370/329 |

(Continued)

OTHER PUBLICATIONS

International Search Report and Written Opinion—PCT/US2018/059843—ISA/EPO—dated Feb. 21, 2021.
(Continued)

*Primary Examiner* — Bob A Phunkulh
(74) *Attorney, Agent, or Firm* — Qualcomm Incorporated

(57) ABSTRACT

Methods, systems, and devices for wireless communications are described. A user equipment (UE) may receive data transmissions on primary cell and transmit feedback for the data transmissions on a secondary cell, where carriers on the secondary cell have a subcarrier spacing that is greater than the subcarrier spacing of carriers on the primary cell. The UE may perform a self-contained transmission by receiving data and transmitting feedback within a single transmission opportunity. The base station may schedule the UE for only downlink transmissions in the primary cell, removing uplink transmission resources and guard periods from slots of primary cell carriers. The UE may transmit other information on the high band cell as well, such as a channel quality indicator or scheduling requests. The base station may apply rate adjustments for downlink transmission in the next slot of a primary cell carrier.

30 Claims, 16 Drawing Sheets

(51) Int. Cl.
  *H04L 5/00*   (2006.01)
  *H04L 1/18*   (2006.01)
  *H04W 92/10*  (2009.01)
  *H04L 5/14*   (2006.01)
  *H04L 27/00*  (2006.01)
  *H04W 72/12*  (2009.01)
  *H04W 28/02*  (2009.01)

(52) U.S. Cl.
  CPC .......... *H04L 1/0009* (2013.01); *H04L 1/0031* (2013.01); *H04L 1/18* (2013.01); *H04L 5/001* (2013.01); *H04L 5/0053* (2013.01); *H04L 1/0026* (2013.01); *H04L 5/14* (2013.01); *H04L 27/0006* (2013.01); *H04W 28/0236* (2013.01); *H04W 72/1226* (2013.01); *H04W 92/10* (2013.01)

(56) References Cited

U.S. PATENT DOCUMENTS

| | | | | |
|---|---|---|---|---|
| 2013/0250821 A1* | 9/2013 | Chun | ................... | H04J 11/0079 370/280 |
| 2013/0260741 A1* | 10/2013 | Yamada | ................ | H04L 1/0026 455/422.1 |
| 2014/0092787 A1* | 4/2014 | Han | ........................ | H04L 65/60 370/280 |
| 2015/0124665 A1* | 5/2015 | Park | .......................... | H04J 4/00 370/280 |
| 2015/0271755 A1* | 9/2015 | Karri | ................. | H04W 28/0221 370/252 |
| 2016/0345326 A1 | 11/2016 | Yerramalli et al. | | |
| 2017/0150387 A1* | 5/2017 | Fujishiro | ............... | H04W 16/14 |
| 2017/0181022 A1* | 6/2017 | Yang | .................... | H04B 7/0456 |
| 2017/0230986 A1* | 8/2017 | Moon | ................... | H04W 74/08 |
| 2017/0237527 A1* | 8/2017 | Lei | ........................ | H04L 1/0001 370/445 |
| 2018/0063736 A1* | 3/2018 | Sadeghi | ............ | H04W 72/0446 |
| 2018/0309496 A1* | 10/2018 | Lee | ..................... | H04B 7/0408 |
| 2018/0367355 A1* | 12/2018 | Pan | ..................... | H04L 27/2646 |
| 2018/0375707 A1* | 12/2018 | Bala | ..................... | H04L 27/2627 |
| 2019/0081688 A1* | 3/2019 | Deenoo | ................ | H04B 7/0695 |

OTHER PUBLICATIONS

LG Electronics: "Discussion on Carrier Aggregation for NR", 3GPP Draft; R1-1717973, vol. RAN WG1, No. Prague, CZ, Oct. 9, 2017-Oct. 13, 2017, Oct. 3, 2017 (Oct. 3, 2017), XP051352854, 9 Pages, http://www.3gpp.org/ftp/tsg_ran/WG1_RL1/TSGR1_90b/Docs/ . . . .

Samsung: "HARQ-ACK Feedback for Numerology Multiplexing", 3GPP Draft; R1-1705402, vol. RAN WG1, No. Spokane, USA, Apr. 3, 2017-Apr. 7, 2017, Apr. 2, 2017 (Apr. 2, 2017), XP051243532, pp. 1-4, http://www.3gpp.org/ftp/Meetings_3GPP_SYNC/RAN1/Docs/ . . . .

* cited by examiner

TECHNIQUES FOR CARRIER FEEDBACK IN WIRELESS SYSTEMS

CROSS REFERENCES

The present Application for Patent claims the benefit of U.S. Provisional Patent Application No. 62/583,708 by YERRAMALLI et al., entitled "TECHNIQUES FOR CARRIER FEEDBACK IN WIRELESS SYSTEMS," filed Nov. 9, 2017, assigned to the assignee hereof, and expressly incorporated by reference herein.

BACKGROUND

The following relates generally to wireless communication, and more specifically to techniques for carrier feedback in wireless systems.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as a Long Term Evolution (LTE) systems or LTE-Advanced (LTE-A) systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

A base station and UE may communicate using multiple cells according to a carrier aggregation (CA) configuration, such as a primary cell and a secondary cell. In some configurations, the slot duration of the secondary cell may be shorter than the slot duration of the primary cell. Wireless devices operating according to the CA configuration may transmit hybrid automatic repeat request (HARD) feedback, such as acknowledgments (ACKs) and negative acknowledgments (NACKs), on the primary cell. However, transmissions such as millimeter wave (mmW) communications on the primary cell may be constrained by channel access procedures, which may delay feedback for the primary cell.

SUMMARY

A base station and user equipment (UE) may communicate using multiple cells according to a CA configuration. For example, the UE and base station may communicate using a low band cell and a high band cell, which may be respective examples of a primary cell and a secondary cell. In some cases, the low band cell and the high band cell may have different subcarrier spacing, which may correspond to shorter slot durations for the high band cell than the low band cell. The UE may receive low band data transmissions and transmit corresponding hybrid automatic repeat request (HARQ) feedback on the high band cell. For instance, in unlicensed wireless communications, the UE may perform a self-contained transmission by receiving data and transmitting feedback within a single transmission opportunity (TxOP).

In some aspects, the base station may schedule the UE for only downlink transmissions in a low band slot, as the UE may transmit HARQ feedback on the high band cell. This may increase downlink throughput by removing uplink transmission resources and guard periods from low band slots. The UE may transmit other information on the high band cell as well, such as a channel quality indicator (CQI). The UE may detect bursty interference in a downlink transmission and indicate the interference to the base station on the high band cell. The base station may apply rate adjustments for downlink transmission in the next low band slot. In some examples, the UE may transmit a scheduling request on the high band cell. The UE may be configured to transmit HARQ feedback, CQI, scheduling requests, or any combination thereof on the high band cell.

A method of wireless communication is described. The method may include identifying a first connection with a primary cell via a first carrier having a first subcarrier spacing, identifying a second connection with a secondary cell via a second carrier having a second subcarrier spacing that is greater than the first subcarrier spacing, and transmitting feedback information for the first carrier via one or more slots of the second carrier.

An apparatus for wireless communication is described. The apparatus may include means for identifying a first connection with a primary cell via a first carrier having a first subcarrier spacing, means for identifying a second connection with a secondary cell via a second carrier having a second subcarrier spacing that is greater than the first subcarrier spacing, and means for transmitting feedback information for the first carrier via one or more slots of the second carrier.

Another apparatus for wireless communication is described. The apparatus may include a processor, memory in electronic communication with the processor, and instructions stored in the memory. The instructions may be operable to cause the processor to identify a first connection with a primary cell via a first carrier having a first subcarrier spacing, identify a second connection with a secondary cell via a second carrier having a second subcarrier spacing that is greater than the first subcarrier spacing, and transmit feedback information for the first carrier via one or more slots of the second carrier.

A non-transitory computer-readable medium for wireless communication is described. The non-transitory computer-readable medium may include instructions operable to cause a processor to identify a first connection with a primary cell via a first carrier having a first subcarrier spacing, identify a second connection with a secondary cell via a second carrier having a second subcarrier spacing that is greater than the first subcarrier spacing, and transmit feedback information for the first carrier via one or more slots of the second carrier.

In some examples of the method, apparatus, and non-transitory computer-readable medium described above, transmitting the feedback information includes: transmitting an uplink message outside of a set of symbols of the first carrier allocated for uplink transmissions.

Some examples of the method, apparatus, and non-transitory computer-readable medium described above may further include processes, features, means, or instructions for receiving, from a base station, one or more downlink messages within a TxOP via the first carrier. Some examples of the method, apparatus, and non-transitory computer-readable medium described above may further include processes, features, means, or instructions for transmitting respective feedback messages for each of the one or more downlink messages before a subsequent TxOP via the first carrier.

Some examples of the method, apparatus, and non-transitory computer-readable medium described above may further include processes, features, means, or instructions for receiving, from a base station, one or more downlink messages via the first carrier. Some examples of the method, apparatus, and non-transitory computer-readable medium described above may further include processes, features, means, or instructions for transmitting respective feedback messages for each of the one or more downlink messages via the one or more slots of the second carrier.

Some examples of the method, apparatus, and non-transitory computer-readable medium described above may further include processes, features, means, or instructions for receiving, from a base station, one or more code blocks via the first carrier, where feedback information for each of the one or more code blocks may be transmitted via respective sets of slots of the second carrier.

Some examples of the method, apparatus, and non-transitory computer-readable medium described above may further include processes, features, means, or instructions for detecting an interference burst over one or more symbols of the first carrier. Some examples of the method, apparatus, and non-transitory computer-readable medium described above may further include processes, features, means, or instructions for transmitting a burst indication via the second carrier in response to detecting the interference burst. Some examples of the method, apparatus, and non-transitory computer-readable medium described above may further include processes, features, means, or instructions for updating a modulation and coding scheme (MCS), rank, precoder, transmission power, resource allocation, or any combination thereof for subsequent one or more symbols of the first carrier based on the burst indication.

Some examples of the method, apparatus, and non-transitory computer-readable medium described above may further include processes, features, means, or instructions for receiving, in response to the burst indication, an update indication for updating the MCS of a subsequent set of symbols for transmission via the first carrier, where the MCS for subsequent one or more symbols may be updated based on the update indication, and where the update indication may be received via the second carrier.

In some examples of the method, apparatus, and non-transitory computer-readable medium described above, transmitting the feedback information includes: transmitting an uplink message including CQI, a rank indicator (RI), beam management information, uplink control information (UCI), an acknowledgement (ACK) message, a negative ACK (NACK) message, a scheduling request (SR) message, a precoding matrix indicator (PMI), a random access channel (RACH) message, a channel state information reference signal resource indicator (CRI), reference signal received power (RSRP), received signal strength indicator (RSSI), or any combination thereof.

In some examples of the method, apparatus, and non-transitory computer-readable medium described above, the uplink message may be transmitted via a physical uplink shared channel (PUSCH) or a physical uplink control channel (PUCCH).

In some examples of the method, apparatus, and non-transitory computer-readable medium described above, the first carrier and the second carrier may have different slot durations.

In some examples of the method, apparatus, and non-transitory computer-readable medium described above, the first carrier may be associated with a lower frequency band than the second carrier.

In some examples of the method, apparatus, and non-transitory computer-readable medium described above, the first carrier may be an unlicensed carrier.

In some examples of the method, apparatus, and non-transitory computer-readable medium described above, the second carrier may be a millimeter wave (mmW) carrier.

A method of wireless communication is described. The method may include identifying a first connection with a UE via a first carrier having a first subcarrier spacing, identifying a second connection with the UE via a second carrier having a second subcarrier spacing that is greater than the first subcarrier spacing, and receiving, from the UE, feedback information for the first carrier via one or more slots of the second carrier.

An apparatus for wireless communication is described. The apparatus may include means for identifying a first connection with a UE via a first carrier having a first subcarrier spacing, means for identifying a second connection with the UE via a second carrier having a second subcarrier spacing that is greater than the first subcarrier spacing, and means for receiving, from the UE, feedback information for the first carrier via one or more slots of the second carrier.

Another apparatus for wireless communication is described. The apparatus may include a processor, memory in electronic communication with the processor, and instructions stored in the memory. The instructions may be operable to cause the processor to identify a first connection with a UE via a first carrier having a first subcarrier spacing, identify a second connection with the UE via a second carrier having a second subcarrier spacing that is greater than the first subcarrier spacing, and receive, from the UE, feedback information for the first carrier via one or more slots of the second carrier.

A non-transitory computer-readable medium for wireless communication is described. The non-transitory computer-readable medium may include instructions operable to cause a processor to identify a first connection with a UE via a first carrier having a first subcarrier spacing, identify a second connection with the UE via a second carrier having a second subcarrier spacing that is greater than the first subcarrier spacing, and receive, from the UE, feedback information for the first carrier via one or more slots of the second carrier.

Some examples of the method, apparatus, and non-transitory computer-readable medium described above may further include processes, features, means, or instructions for configuring a set of time-frequency resources of the second carrier for feedback information, where the feedback information may be received via the configured set of time-frequency resources.

Some examples of the method, apparatus, and non-transitory computer-readable medium described above may further include processes, features, means, or instructions for transmitting, to the UE, an indication of the configured set of time-frequency resources.

In some examples of the method, apparatus, and non-transitory computer-readable medium described above, the set of time-frequency resources may be configured based on a capability of the UE, the first subcarrier spacing, the second subcarrier spacing, or any combination thereof.

In some examples of the method, apparatus, and non-transitory computer-readable medium described above, receiving the feedback information includes: receiving, from the UE, an uplink message outside of a set of symbols of the first carrier allocated for uplink transmissions.

Some examples of the method, apparatus, and non-transitory computer-readable medium described above may further include processes, features, means, or instructions for transmitting one or more downlink messages within a TxOP of the UE. Some examples of the method, apparatus, and non-transitory computer-readable medium described above may further include processes, features, means, or instructions for receiving respective feedback messages for each of the one or more downlink messages before a subsequent TxOP of the UE via the first carrier.

Some examples of the method, apparatus, and non-transitory computer-readable medium described above may further include processes, features, means, or instructions for transmitting one or more downlink messages. Some examples of the method, apparatus, and non-transitory computer-readable medium described above may further include processes, features, means, or instructions for receiving respective feedback messages for each of the one or more downlink messages via the one or more slots of the second carrier.

Some examples of the method, apparatus, and non-transitory computer-readable medium described above may further include processes, features, means, or instructions for transmitting, to the UE, one or more code blocks via the first carrier, where feedback information for each of the one or more code blocks may be received via respective sets of slots of the second carrier.

Some examples of the method, apparatus, and non-transitory computer-readable medium described above may further include processes, features, means, or instructions for receiving, from the UE, a burst indication via the second carrier based on an interference burst associated to the first carrier. Some examples of the method, apparatus, and non-transitory computer-readable medium described above may further include processes, features, means, or instructions for determining an MCS, rank, precoder, transmission power, resource allocation, or any combination thereof a subsequent set of symbols based on the burst indication. Some examples of the method, apparatus, and non-transitory computer-readable medium described above may further include processes, features, means, or instructions for transmitting, in response to the burst indication, an update indication that includes the MCS, rank, precoder, transmission power, resource allocation, or any combination thereof the subsequent set of symbols.

In some examples of the method, apparatus, and non-transitory computer-readable medium described above, receiving the feedback information includes: receiving, from the UE, an uplink message including CQI, an RI, beam management information, UCI, an ACK message, a NACK message, an SR message, a PMI, a RACH message, a CRI, RSRP, RSSI, or any combination thereof.

In some examples of the method, apparatus, and non-transitory computer-readable medium described above, the uplink message may be received via a PUSCH or a PUCCH.

In some examples of the method, apparatus, and non-transitory computer-readable medium described above, the first carrier and the second carrier may have different slot durations.

In some examples of the method, apparatus, and non-transitory computer-readable medium described above, the first carrier may be associated with a lower frequency band than the second carrier.

In some examples of the method, apparatus, and non-transitory computer-readable medium described above, the first carrier may be an unlicensed carrier.

In some examples of the method, apparatus, and non-transitory computer-readable medium described above, the second carrier may be a mmW carrier.

DETAILED DESCRIPTION

Figure 1:
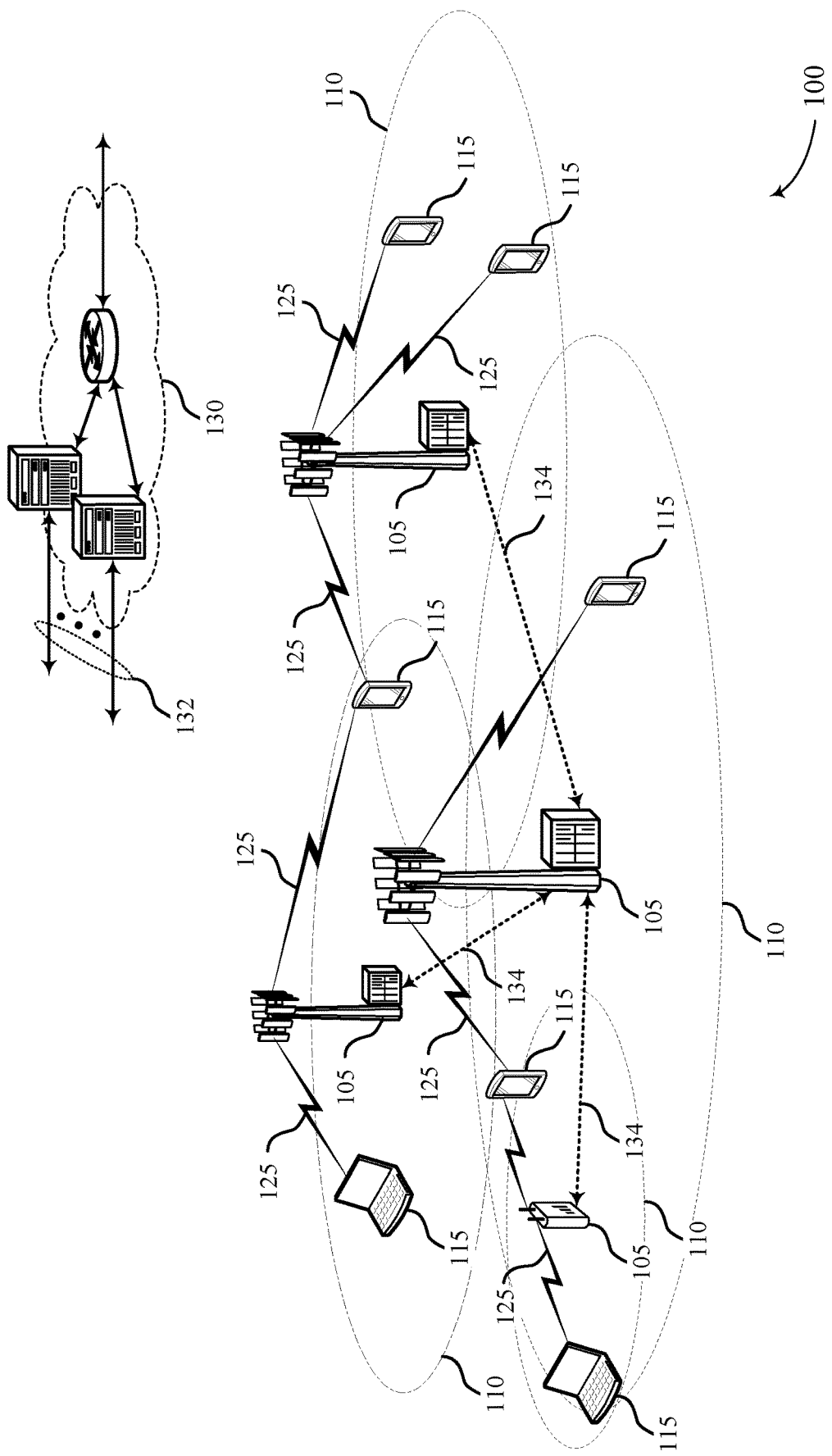
FIG. 1 illustrates an example of a wireless communications system that supports techniques for carrier feedback in wireless systems in accordance with aspects of the present disclosure.

A base station and user equipment (UE) may communicate using multiple cells according to a carrier aggregation (CA) configuration. For example, the UE and base station may communicate using a low band cell and a high band cell, which may be respective examples of a primary cell and a secondary cell. The low band cell and the high band cell may each be configured for licensed or unlicensed communications according to a time division duplexing (TDD) configuration. In some cases, the low band cell and the high band cell may have different subcarrier spacing. For example, the low band cell may have a subcarrier spacing of 60 kilohertz (kHz) or 30 kHz, and the high band cell may have subcarrier spacing of 960 kHz or 480 kHz. Therefore, the slot duration for transmissions on the high band cell may be shorter than the slot duration for transmissions on the low band cell. In some wireless systems, devices operating according to a CA configuration may transmit hybrid automatic repeat request (HARQ) feedback, such as an acknowledgment (ACK) or a negative acknowledgment (NACK), on the low band cell. However, millimeter-wave (mmW) transmissions on the low band cell may be constrained by channel access procedures, and the low band cell may be relatively less accessible than the high band cell.

Instead, the UE may transmit HARQ feedback on the high band cell. The base station may configure resources on the high band cell for HARQ-ACK reporting. In some cases, the channel availability and high turn-around times on the high band cell may benefit the UE in reliably and promptly transmitting HARQ feedback. For example, in unlicensed wireless communications, the UE may perform a self-contained transmission by receiving data and transmitting feedback within a single transmission opportunity (TxOP). In some examples, the base station may schedule the UE for only downlink transmissions in a low band slot, as the UE may transmit HARQ feedback on the high band cell. This may increase downlink throughput by removing uplink transmission resources and guard periods from low band slots.

The UE may transmit other information on the high band cell as well. For example, the UE may transmit a channel quality indicator (CQI) on the high band cell. The UE may transmit CQI on the high band cell to meet self-contained transmission timelines. The UE may detect bursty interference in a downlink transmission and indicate the interference to the base station on the high band cell. The base station may apply rate adjustments for downlink transmission in the next low band slot. In some examples, the UE may transmit a scheduling request on the high band cell. the UE may transmit the scheduling request for the low band cell or the high band cell. The UE may be configured to transmit HARQ feedback, CQI, scheduling requests, or any combination thereof on the high band cell.

Aspects of the disclosure are initially described in the context of a wireless communications system. Aspects are then described with respect to HARQ and interference feedback examples. Aspects of the disclosure are further illustrated by and described with reference to apparatus diagrams, system diagrams, and flowcharts that relate to techniques for carrier feedback in wireless systems.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions, from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1 or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support mmW communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with component carriers (CCs) operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based on listening according to different receive beam directions (e.g., a beam direction determined to have a highest signal strength, highest signal-to-noise ratio, or otherwise acceptable signal quality based on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use HARQ to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected CCs using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved Universal Terrestrial Radio Access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple subcarriers (e.g., using multi-carrier modulation (MCM) techniques such as orthogonal frequency division multiplexing (OFDM) or discrete Fourier transform-spread-OFDM (DFT-S-OFDM).

The organizational structure of the carriers may be different for different radio access technologies (e.g., LTE, LTE-A, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a CA configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or resource blocks (RBs)) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that can support simultaneous communications via carriers associated with more than one different carrier bandwidth.

Wireless communications system 100 may support communication with a UE 115 on multiple cells or carriers, a feature which may be referred to as CA or multi-carrier operation. A UE 115 may be configured with multiple downlink CCs and one or more uplink CCs according to a CA configuration. CA may be used with both FDD and TDD CCs.

In some cases, wireless communications system 100 may utilize enhanced CCs (eCCs). An eCC may be characterized by one or more features including wider carrier or frequency channel bandwidth, shorter symbol duration, shorter TTI duration, or modified control channel configuration. In some cases, an eCC may be associated with a CA configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

Wireless communications system 100 may support a UE 115 transmitting feedback for a primary cell on a secondary cell, where the primary cell and the secondary cell have different subcarrier spacing, or different slot durations. For example, the UE 115 may transmit HARQ feedback on a carrier associated with the secondary cell in response to transmissions received on a carrier associated with the primary cell. The UE 115 may transmit HARQ feedback, channel quality indicators, and/or scheduling requests (SRs), among other feedback information, on the secondary cell.

Figure 2:
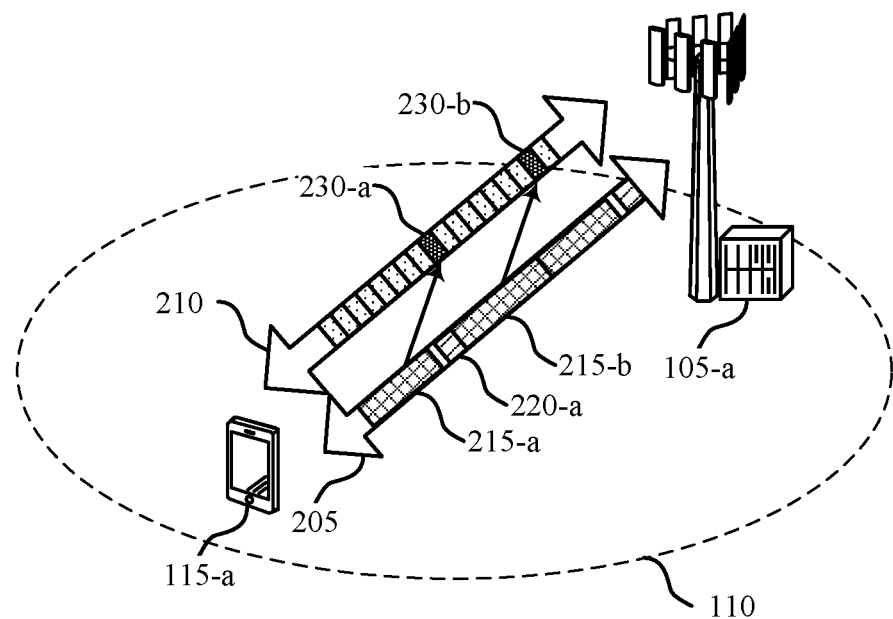
FIG. 2 illustrates an example of a wireless communications system that supports techniques for carrier feedback in wireless systems in accordance with aspects of the present disclosure.

FIG. 2 illustrates an example of a wireless communications system 200 that supports techniques for carrier feedback in wireless systems in accordance with various aspects of the present disclosure. In some examples, wireless communications system 200 may implement aspects of wireless communications system 100. Wireless communications system 200 includes UE 115-a and base station 105-a, which may be respective examples of a UE 115 and a base station 105 as described herein.

Base station 105-a and UE 115-a, operating according to a CA configuration, may communicate using multiple cells. For example, UE 115-a and base station 105-a may communicate using a low band cell 205 and a high band cell 210, where the high band cell 210 operates at a higher frequency than the low band cell 205. In some cases, the low band cell 205 may be a primary cell, and the high band cell 210 may be an example of a secondary cell. The low band cell 205 and the high band cell 210 may each be configured for uplink and downlink communications, such as in a TDD configuration. Base station 105-a may transmit downlink transmission 215 or receive uplink transmission 220 on the low band cell 205. UE 115-a and base station 105-a may communicate using high band slots 225 of the high band cell 210, each of which may be configurable for uplink or downlink communications. The low band cell 205, the high band cell 210, or both, may be configured for licensed wireless communications or unlicensed wireless communications. In some cases, the low band cell 205, the high band cell 210, or both, may be configured for mmW communications.

The low band cell 205 may have different subcarrier spacing than the high band cell 210. For example, the low band cell 205 may have a subcarrier spacing of 60 kHz or 30 kHz, and the high band cell 210 may have subcarrier spacing of 960 kHz or 480 kHz. Therefore, the slot duration for transmissions on the high band cell 210 may be smaller than the slot duration for transmissions on the low band cell 205 and the high band cell 210 may. For example, the low band cell 205 may use 0.5 ms slots, and the high band slots 225 may have a shorter duration (e.g., 0.5/16 ms, or 31.25 microseconds, such that one slot of the low band cell 205 lasts the duration of 16 high band slots 225). In some cases, the high band slots 225 may have a smaller duration than the duration of one low band symbol.

In some wireless systems, devices operating according to a CA configuration may transmit HARQ ACK/NACK feedback on the low band cell 205. However, mmW transmissions on the low band cell 205 may be constrained by channel access, and the low band cell 205 may be relatively less accessible than the high band cell 210. Therefore, UE 115-a may transmit an ACK/NACK 230 on the high band cell 210. Base station 105-a may configure some resources on the high band cell 210 for HARQ-ACK reporting. In some cases, the channel availability and high turn-around times on the high band cell may benefit UE 115-a in reliably and promptly transmitting ACK/NACK 230. For example, UE 115-a may perform a self-contained transmission in unlicensed communications by receiving data and transmitting ACK/NACK 230 within a single TxOP.

For example, base station 105-a may transmit data in downlink transmission 215-a on the low band cell 205, and UE 115-a may transmit ACK/NACK 230-a on the high band cell 210 in response. The remaining portion of the low band slot may include uplink transmission 220-a, during which UE 115-a may transmit control information or data. In some cases, UE 115-a may not be scheduled for an uplink transmission 220 during a low band slot. In some cases, UE 115-a may normally be scheduled for uplink transmission on the high band cell 210 to transmit ACK/NACK 230, but UE 115-a may instead transmit ACK/NACK 230 on the high band cell 210. For example, base station 105-a may transmit data in downlink transmission 215-b for an entire duration of a low band slot, and UE 115-a may transmit ACK/NACK 230-b in response. Thus, downlink transmission 215-b may span an entire low band slot. Transmitting ACK/NACK may improve throughput by allocating entire slots to downlink transmissions 215.

UE 115-a may transmit other information on the high band cell 210 as well. For example, UE 115-a may transmit a CQI on the high band cell 210. UE 115-a may transmit CQI on the high band cell 210 to meet self-contained transmission timelines. UE 115-a may detect bursty interference in a downlink transmission 215 and indicate the interference to base station 105-a on the high band cell 210. Base station 105-a may apply rate adjustments for downlink transmission 215 in the next low band slot.

In some examples, UE 115-a may transmit a scheduling request on the high band cell 210. UE 115-a may transmit the scheduling request for the low band cell 205 or the high band cell 210. UE 115-a may be configured to transmit HARQ feedback, CQI, SRs, or any combination thereof on the high band cell 210. UE 115-a may also transmit a rank indicator (RI), beam management information, uplink control information (UCI), a precoding matrix indicator (PMI), a random access channel (RACH) message, a channel state information reference signal resource indicator (CRI), reference signal received power (RSRP), received signal strength indicator (RSSI), or any combination thereof on the high band cell 210.

Figure 3:
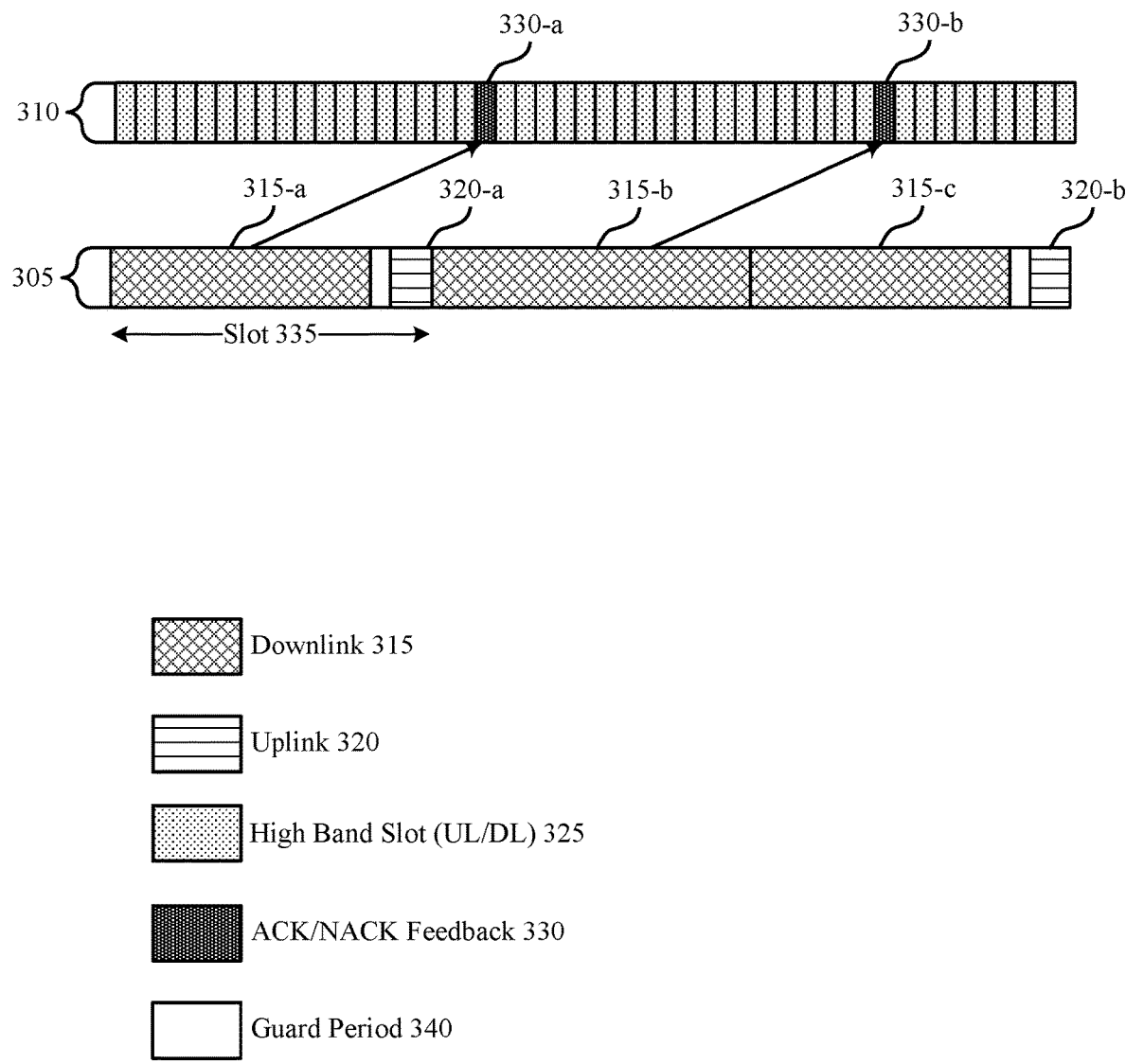
FIG. 3 illustrates an example of high band hybrid automatic repeat request (HARQ) feedback that supports techniques for carrier feedback in wireless systems in accordance with aspects of the present disclosure.

FIG. 3 illustrates an example of high band HARQ feedback 300 that supports techniques for carrier feedback in wireless systems in accordance with various aspects of the present disclosure. In some examples, high band HARQ feedback 300 may implement aspects of wireless communications systems 100 or 200.

A UE 115 and a base station 105 may communicate using low band cell 305 and high band cell 310 in a CA configuration. The base station 105 may allocate resources on the low band cell 305 for downlink transmission 315 and uplink transmission 320. A high band slot 325 may also be configured for uplink or downlink transmission. In some cases, the low band cell 305 may be a primary cell, and the high band cell 310 may be an example of a secondary cell.

In some cases, the base station 105 may allocate resources on the high band cell 310 for an ACK/NACK 330. For example, the base station 105 may transmit data to the UE 115 in downlink transmission 315-a. If a physical uplink shared channel (PUSCH) is scheduled on the high band cell 310, HARQ-ACK may be carried on the PUSCH of the high band cell 310. The UE 115 may transmit HARQ feedback, ACK/NACK 330-a, on the high band cell 310 based on whether the UE successfully received the downlink transmission 315-a. The UE 115 may transmit an ACK/NACK 330 slightly after receiving the downlink transmission 315 on the high band cell 310. The UE 115 may similarly transmit ACK/NACK 330-b for downlink transmission 315-b. In some cases, the UE 115 may transmit a scheduling request or CQI on the high band cell 310 using similar techniques.

In some cases, a slot 335 may include a downlink transmission 315 and an uplink transmission 320. For example, downlink transmission 315-a and uplink transmission 320-a are in a slot 335, separated by a guard period 340. In some other examples, the base station 105 may allocate resources for downlink transmission 315 and not resources for an uplink transmission 320 in a slot. For example, downlink transmission 315-b may span the entirety of a slot 335. In some cases, spectral efficiency may be improved by removing the guard period 340 and uplink transmission 320 in the low band cell 305. The UE 115 may be scheduled based on a variety of slot configurations. For example, after a slot 335 of only downlink transmission 315-b, the UE 115 may be scheduled for a slot 335 including downlink transmission 315-c, a guard period 340, and uplink transmission 320-b.

The low band cell 305 may have different subcarrier spacing than the high band cell 310. For example, the low band cell 305 may have subcarrier spacing of 60 kHz or 30 kHz, and the high band cell 310 may have subcarrier spacing of 960 kHz or 480 kHz. Based on the subcarrier spacing, the high band slots (e.g., high band slots 325) may have a shorter duration than low band slots. (e.g., slot 335). For instance, the low band cell 305 may use 0.5 ms slots, and the high band slots 325 may have a duration of 0.5/16 ms, or 31.25 microseconds. Thus, one slot of the low band cell 305 may span the duration of 16 high band slots 325. In some cases, the high band slots 325 may have a smaller duration than the duration of one low band symbol.

Figure 4:
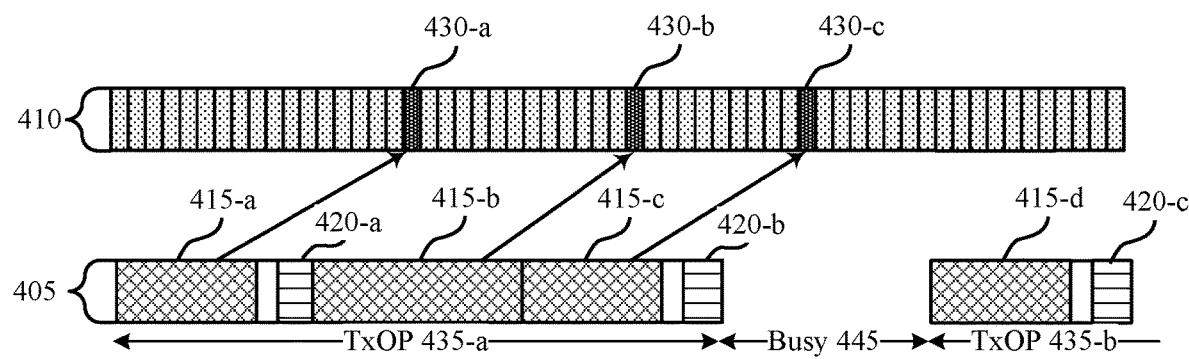
FIG. 4 illustrates an example of unlicensed high band HARQ feedback that supports techniques for carrier feedback in wireless systems in accordance with aspects of the present disclosure.

FIG. 4 illustrates an example of unlicensed high band HARQ feedback 400 that supports techniques for carrier feedback in wireless systems in accordance with various aspects of the present disclosure. In some examples, unlicensed high band HARQ feedback 400 may implement aspects of wireless communications systems 100 or 200.

A UE 115 and a base station 105 may communicate using low band cell 405 and high band cell 410 in a CA configuration. The base station 105 may allocate resources on the low band cell 405 for downlink transmission 415 and uplink transmission 420. A high band slot 425 may also be configured for uplink or downlink transmission. In some cases, the low band cell 405 may be a primary cell, and the high band cell 410 may be an example of a secondary cell.

In some examples, the UE 115 and base station 105 may engage in unlicensed wireless communication. The base station 105 may allocate one or more TxOPs (e.g., TxOP 435-a or TxOP 435-b) on the low band cell 405 to the UE 115. For instance, the UE 115 may be allocated three slots in TxOP 435-a. TxOP 435-a may include downlink transmission 415-a, a guard period 440, and uplink transmission 420-a in a first slot, downlink transmission 415-b in a second slot, and downlink transmission 415-c, a guard period 440, and uplink transmission 420-c in a third slot. Thus, a low band slot may include a downlink transmission 415 and an uplink transmission 420 separated by a guard period 440, or a low band slot may include just a downlink transmission 415.

The low band cell 405 may have different subcarrier spacing than the high band cell 410. For example, the low band cell 405 may have subcarrier spacing of 60 kHz or 30 kHz, and the high band cell 410 may have subcarrier spacing of 960 kHz or 480 kHz. Based on the subcarrier spacing, the high band slots (e.g., high band slots 425) may have a shorter duration than low band slots. (e.g., including downlink transmission 415-a, the guard period 440, and uplink transmission 420-a). For instance, the low band cell 405 may use 0.5 ms slots, and the high band slots 425 may have a duration of 0.5/16 ms, or 31.25 microseconds. Thus, one slot of the low band cell 405 may span the duration of 16 high band slots 425. In some cases, the high band slots 425 may have a smaller duration than the duration of one low band symbol.

In some cases, the base station 105 may allocate resources on the high band cell 410 for an ACK/NACK 430. For example, the base station 105 may transmit data to the UE 115 in downlink transmission 415-a, and the UE 115 may transmit ACK/NACK 430-a. If PUSCH is scheduled on the high band cell 410, HARQ-ACK may be carried on the PUSCH of the high band cell 410. The UE 115 may transmit ACK/NACK 430-a on the high band cell 410 based on whether the UE 115 successfully received the downlink transmission 415-a. Similarly, the UE 115 may transmit ACK/NACK 430-b and 430-c for downlink transmissions 415-b and 415-c respectively.

The UE 115 may transmit ACK/NACK 430 slightly after receiving the downlink transmission 415 on the high band cell 410. In some cases, the location of high band cell resources available for HARQ-ACK transmission may be based on a processing capability of the UE 115 and the downlink duration in a slot. In some cases, the base station 105 and UE 115 may conservatively use the full slot duration to determine the high band cell resources for ACK transmission. Thus, the UE 115 may perform a self-contained, unlicensed transmission by receiving a downlink transmission 415 and transmitting corresponding ACK/NACK 430 in the same TxOP 435. For example, the UE 115 receives downlink transmission 415-a and transmits ACK/NACK 430-a in TxOP 435-a. In some cases, the UE 115 may transmit a scheduling request or CQI on the high band cell 410 using similar techniques.

After TxOP 435-a, the low band cell 405 may enter a busy period 445, where the UE 115 may not have access to the low band cell 405. After the busy period 445 (e.g., spanning the duration of a low band slot), the UE 115 may be scheduled for a carrier on the low band cell 405 during TxOP 435-b, receive downlink transmission 415-d, and transmit uplink transmission 420-c.

Figure 5:
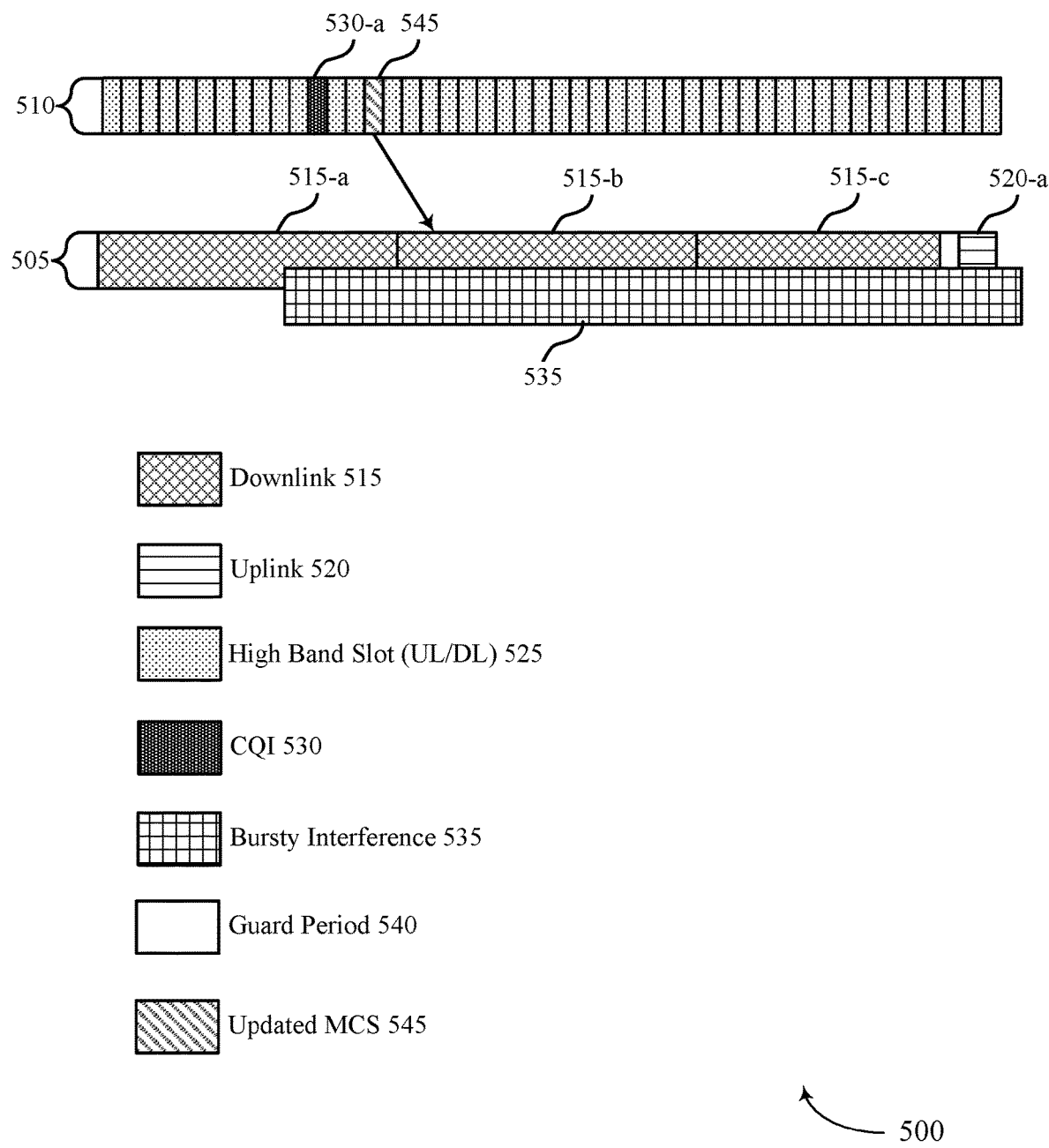
FIG. 5 illustrates an example of burst interference feedback that supports techniques for carrier feedback in wireless systems in accordance with aspects of the present disclosure.

FIG. 5 illustrates an example of burst interference feedback 500 that supports techniques for carrier feedback in wireless systems in accordance with various aspects of the present disclosure. In some examples, burst interference feedback 500 may implement aspects of wireless communications systems 100 or 200.

A UE 115 and a base station 105 may communicate using a carrier on a low band cell 505 and a carrier on a high band cell 510 in a CA configuration. The low band cell 505 and the high band cell 510 may be respective examples of a low band cell and a high band cell as described herein, specifically with reference to FIGS. 2-3.

The base station 105 may allocate resources on the low band cell 505 for downlink transmission 515, or downlink transmission 515 and uplink transmission 520 separated by a guard period 540. A high band slot 525 may also be configured for uplink or downlink transmission. In some cases, the low band cell 505 may be a primary cell, and the high band cell 510 may be an example of a secondary cell. The base station 105 may transmit data in downlink transmissions 515. For example, downlink transmission 515-a and downlink transmission 515-a may each span a low band slot and carry downlink data.

In some cases, a neighboring wireless device may begin transmitting during a slot of the low band cell 505. The UE 115 may detect bursty interference 535 on part of downlink transmission 515-a and transmit CQI 530 to the base station 105. CQI 530-a may indicate the presence of the bursty interference 535 on the low band cell 505 to the base station 105. In some cases, the UE 115 may transmit the CQI on the high band cell 510 to meet a timeline for self-contained transmission. In some examples, the UE 115 may also transmit HARQ feedback or scheduling requests, or both, on the high band cell 510 as described herein.

Based on receiving the CQI 530, the base station may make a rate adjustment and transmit an indication of the adjustment, such as the updated modulation and coding scheme (MCS) 545, to the UE 115. The base station 105 may update the MCS, a rank, a precoder, transmission power, resource allocation, or any combination thereof for a subsequent set of symbols (e.g., downlink transmission 515-b).

The UE 115 may then use the updated MCS 545 for downlink transmissions 515-b and 515-c as well as uplink transmission 520-a.

Figure 6:
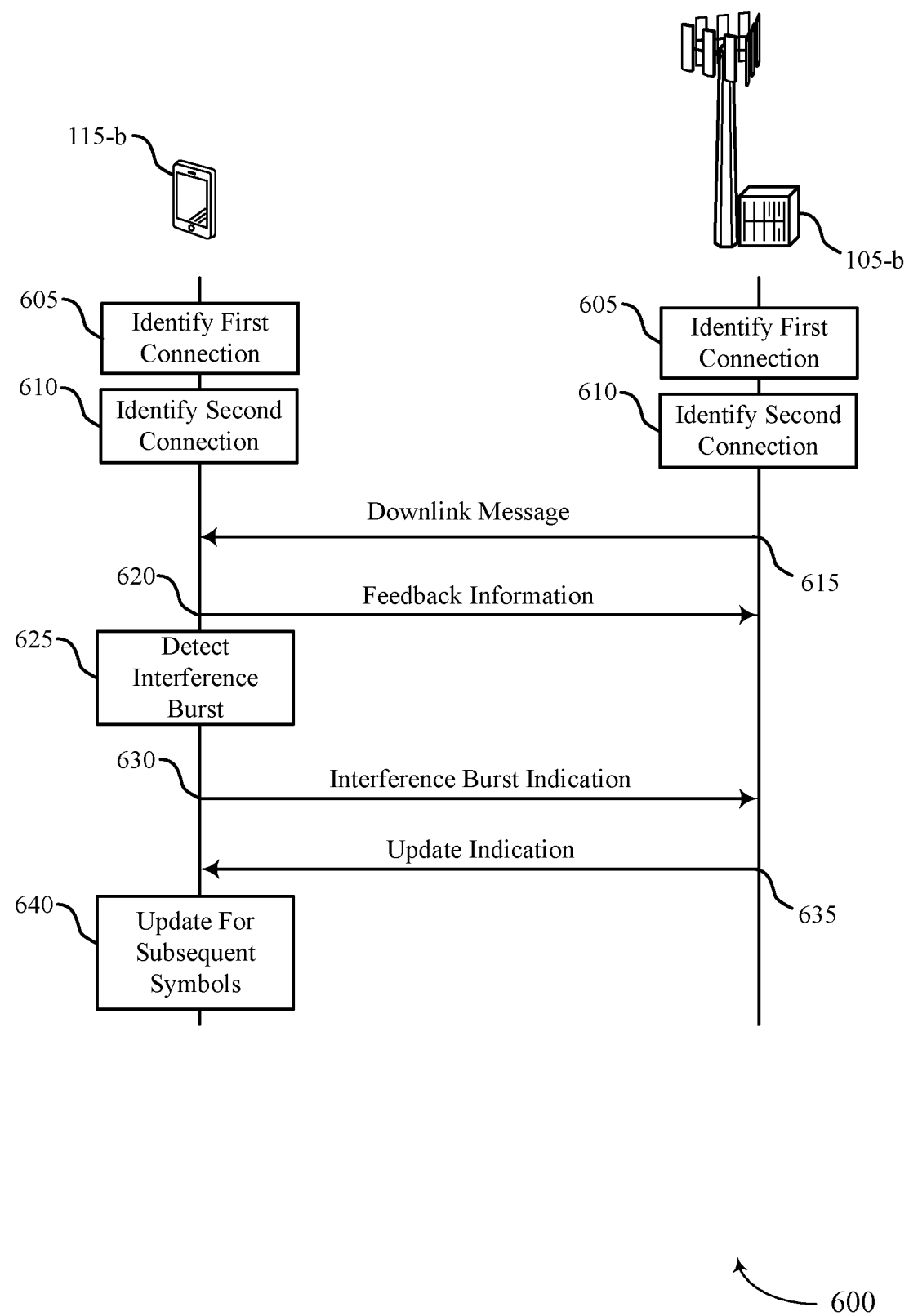
FIG. 6 illustrates an example of a process flow that supports techniques for carrier feedback in wireless systems in accordance with aspects of the present disclosure.

FIG. 6 illustrates an example of a process flow 600 that supports techniques for carrier feedback in wireless systems in accordance with various aspects of the present disclosure. In some examples, process flow 600 may implement aspects of wireless communications systems 100 or 200. Process flow 600 includes UE 115-b and base station 105-b, which may be respective examples of a UE 115 and a base station 105 as described herein.

At 605, base station 105-b and UE 115-b may identify a first connection between the devices. For example, UE 115-b may identify a first connection with a primary cell via a first carrier having a first slot duration or a first subcarrier spacing. Base station 105-b may identify a first connection with UE 115-b via the first carrier having the first slot duration.

At 610, the devices may identify a second connection. For example, UE 115-b may identify a second connection with a secondary cell via a second carrier having a second slot duration that is less than the first slot duration or a second subcarrier spacing that is greater than the first subcarrier spacing. Base station 105-b may identify a second connection with UE 115-b via a second carrier having a second slot duration that is less than the first slot duration or a second subcarrier spacing that is greater than the first subcarrier spacing.

In some examples, the first carrier and the second carrier have different subcarrier spacings or slot durations. In some cases, the first carrier may be associated with a lower frequency band than the second carrier. In some instances, the first carrier may be an unlicensed carrier, and the second carrier may be an mmW carrier.

At 615, base station 105-b may transmit a downlink message to UE 115-b via the first carrier. At 620, UE 115-b may transmit feedback information for the first carrier via one or more slots of the second carrier. In some cases, the downlink message may be transmitted during a TxOP of the first carrier, and UE 115-b may transmit feedback for the downlink message before a subsequent TxOP (e.g., within the same TxOP). In some cases, UE 115-b may receive multiple downlink messages via the first carrier and transmit respective feedback information for each of the multiple downlink messages via the second carrier.

The feedback information may include CQI, an RI, beam management information, UCI, an ACK message, a NACK message, an SR message, a PMI, a RACH message, a CRI, RSRP, RSSI, or any combination thereof.

In some cases, UE 115-b may detect interference burst over one or more symbols of the first carrier at 625. At 630, UE 115-b may transmit a burst indication via the second carrier in response to the interference burst.

Base station 105-b may determine a modulation and coding scheme (MCS), rank, precoder, transmission power, resource allocation, or any combination thereof a subsequent set of symbols based on the burst indication. Base station 105-b may transmit, in response to the burst indication, an update indication that includes the MCS, rank, precoder, transmission power, resource allocation, or any combination thereof at 635. At 640, UE 115-b may update an MCS, rank, precoder, transmission power, resource allocation, or any combination thereof, based on the update indication.

Figure 7:
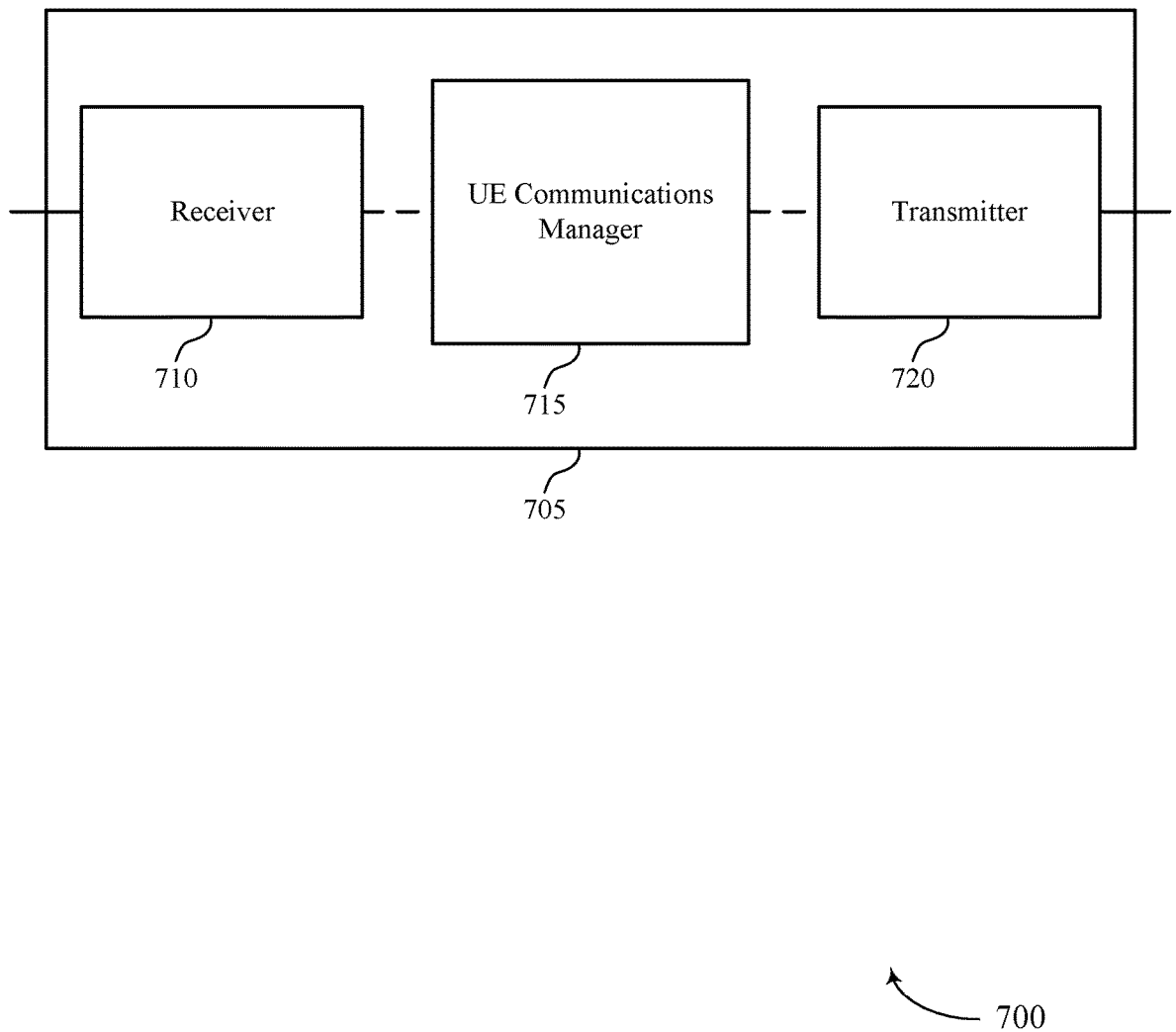
FIGS. 7 through 9 show block diagrams of a device that supports techniques for carrier feedback in wireless systems in accordance with aspects of the present disclosure.

FIG. 7 shows a block diagram 700 of a wireless device 705 that supports techniques for carrier feedback in wireless systems in accordance with aspects of the present disclosure. Wireless device 705 may be an example of aspects of a UE 115 as described herein. Wireless device 705 may include receiver 710, UE communications manager 715, and transmitter 720. Wireless device 705 may also include a processor. Each of these components may be in communication with one another (e.g., via one or more buses).

Receiver 710 may receive information such as packets, user data, or control information associated with various information channels (e.g., control channels, data channels, and information related to techniques for carrier feedback in wireless systems, etc.). Information may be passed on to other components of the device. The receiver 710 may be an example of aspects of the transceiver 1035 described with reference to FIG. 10. The receiver 710 may utilize a single antenna or a set of antennas.

UE communications manager 715 may be an example of aspects of the UE communications manager 1015 described with reference to FIG. 10. UE communications manager 715 and/or at least some of its various sub-components may be implemented in hardware, software executed by a processor, firmware, or any combination thereof. If implemented in software executed by a processor, the functions of the UE communications manager 715 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure.

The UE communications manager 715 and/or at least some of its various sub-components may be physically located at various positions, including being distributed such that portions of functions are implemented at different physical locations by one or more physical devices. In some examples, UE communications manager 715 and/or at least some of its various sub-components may be a separate and distinct component in accordance with various aspects of the present disclosure. In other examples, UE communications manager 715 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

UE communications manager 715 may identify a first connection with a primary cell via a first carrier having a first slot duration or a first subcarrier spacing, identify a second connection with a secondary cell via a second carrier having a second slot duration that is less than the first slot duration or a second subcarrier spacing that is greater than the first subcarrier spacing, and transmit feedback information for the first carrier via one or more slots of the second carrier.

Transmitter 720 may transmit signals generated by other components of the device. In some examples, the transmitter 720 may be collocated with a receiver 710 in a transceiver module. For example, the transmitter 720 may be an example of aspects of the transceiver 1035 described with reference to FIG. 10. The transmitter 720 may utilize a single antenna or a set of antennas.

Figure 8:
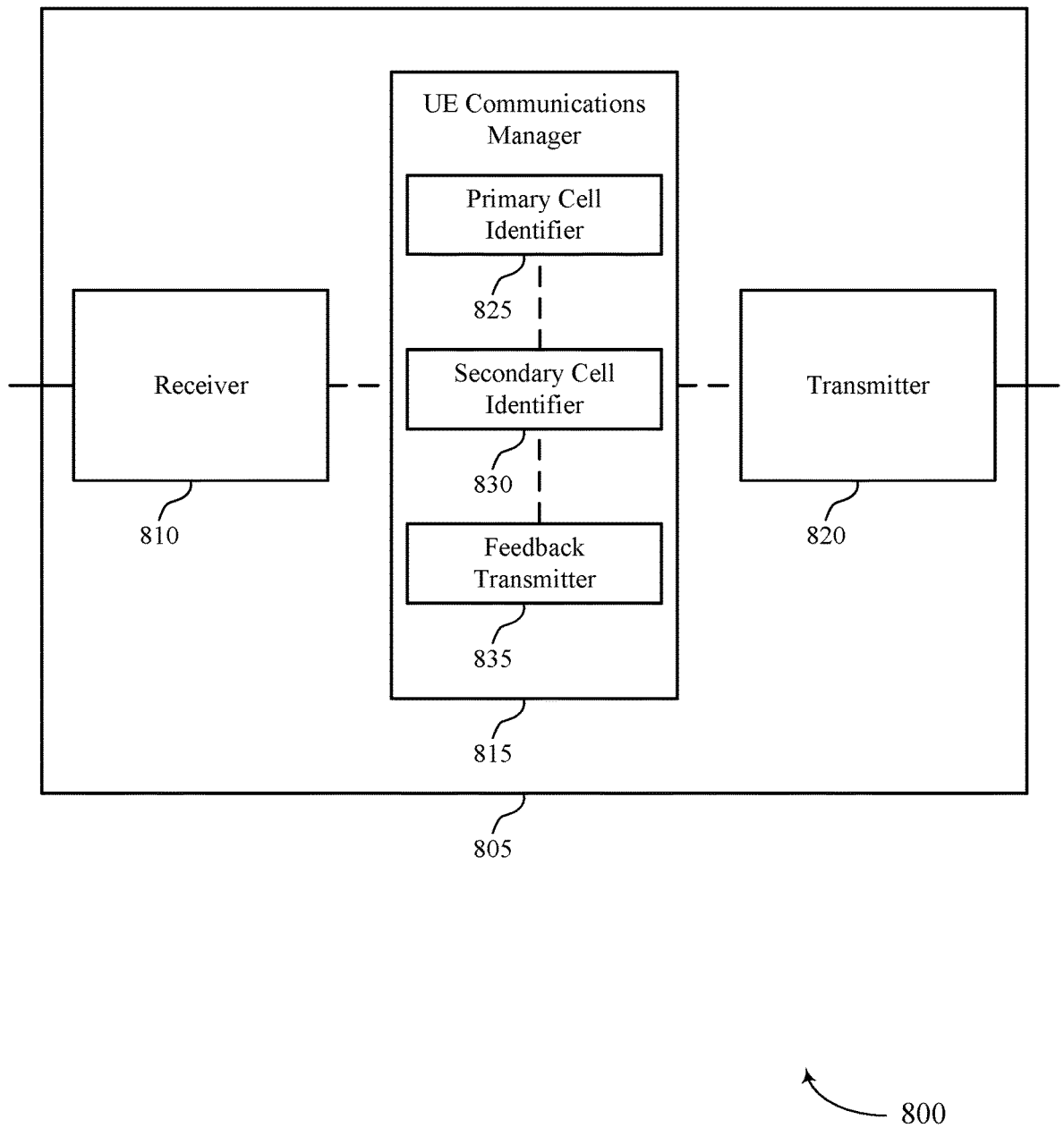

FIG. 8 shows a block diagram 800 of a wireless device 805 that supports techniques for carrier feedback in wireless systems in accordance with aspects of the present disclosure. Wireless device 805 may be an example of aspects of a wireless device 705 or a UE 115 as described with reference to FIG. 7. Wireless device 805 may include receiver 810, UE communications manager 815, and transmitter 820. Wireless device 805 may also include a processor. Each of these components may be in communication with one another (e.g., via one or more buses).

Receiver 810 may receive information such as packets, user data, or control information associated with various information channels (e.g., control channels, data channels, and information related to techniques for carrier feedback in wireless systems, etc.). Information may be passed on to other components of the device. The receiver 810 may be an example of aspects of the transceiver 1035 described with reference to FIG. 10. The receiver 810 may utilize a single antenna or a set of antennas.

UE communications manager 815 may be an example of aspects of the UE communications manager 1015 described with reference to FIG. 10. UE communications manager 815 may also include primary cell identifier 825, secondary cell identifier 830, and feedback transmitter 835.

Primary cell identifier 825 may identify a first connection with a primary cell via a first carrier having a first slot duration or a first subcarrier spacing. In some cases, the first carrier is associated with a lower frequency band than the second carrier. In some cases, the first carrier is an unlicensed carrier or a licensed carrier.

Secondary cell identifier 830 may identify a second connection with a secondary cell via a second carrier having a second slot duration that is less than the first slot duration or a second subcarrier spacing that is greater than the first subcarrier spacing. In some cases, the first carrier and the second carrier have different subcarrier spacings or slot durations. In some cases, the second carrier is a mmW carrier.

Feedback transmitter 835 may transmit feedback information for the first carrier via one or more slots of the second carrier, transmit respective feedback messages for each of the one or more downlink messages before a subsequent TxOP, and transmit respective feedback messages for each of the one or more downlink messages. In some cases, transmitting the feedback information includes: transmitting an uplink message outside of a set of symbols of the first carrier allocated for uplink transmissions. In some cases, transmitting the feedback information includes: transmitting an uplink message including CQI, an RI, beam management information, UCI, an ACK message, a NACK message, an SR message, a PMI, a RACH message, a CRI, RSRP, RSSI, or any combination thereof. In some cases, the uplink message is transmitted via PUSCH or a physical uplink control channel (PUCCH).

Transmitter 820 may transmit signals generated by other components of the device. In some examples, the transmitter 820 may be collocated with a receiver 810 in a transceiver module. For example, the transmitter 820 may be an example of aspects of the transceiver 1035 described with reference to FIG. 10. The transmitter 820 may utilize a single antenna or a set of antennas.

Figure 9:
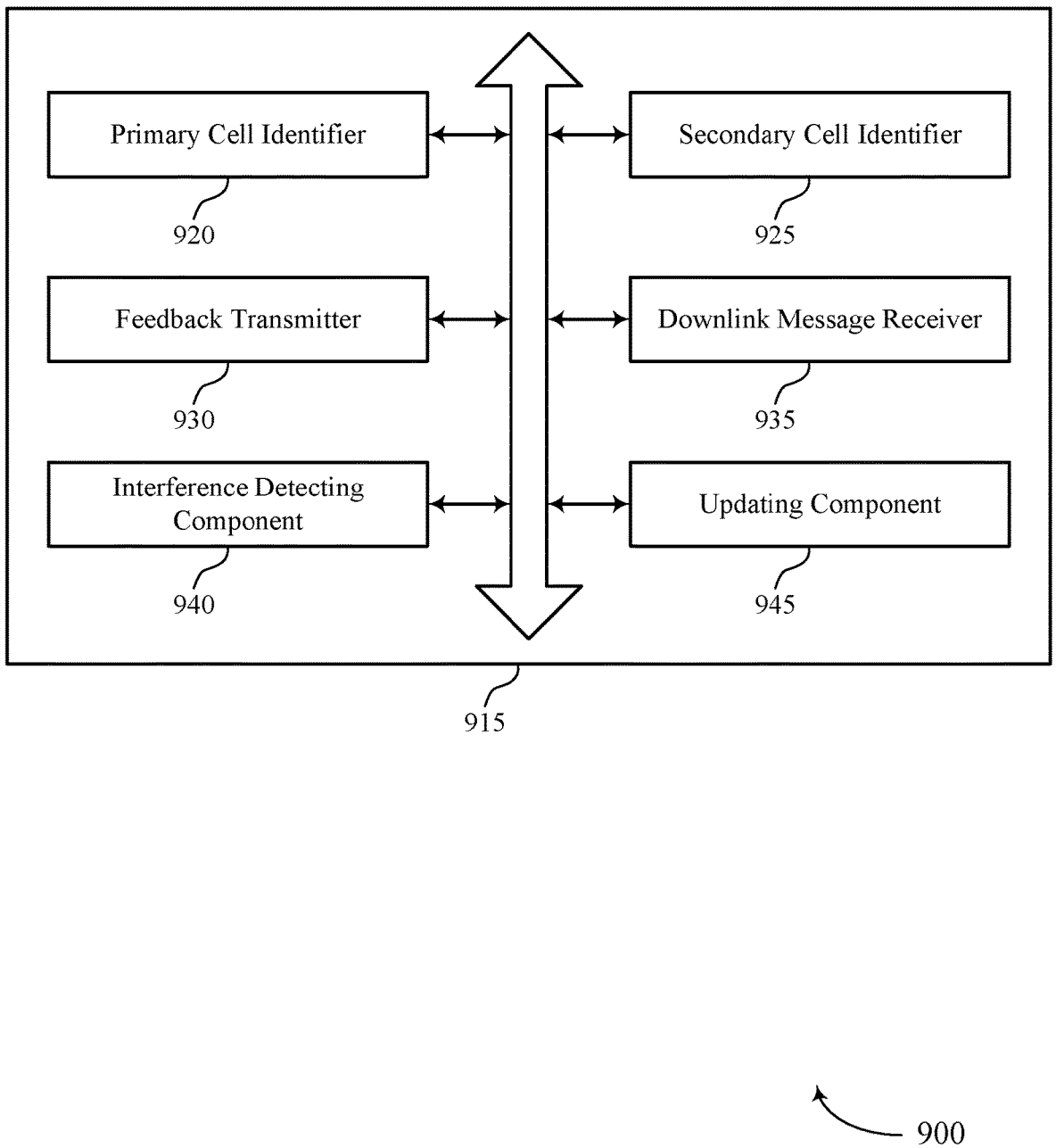

FIG. 9 shows a block diagram 900 of a UE communications manager 915 that supports techniques for carrier feedback in wireless systems in accordance with aspects of the present disclosure. The UE communications manager 915 may be an example of aspects of a UE communications manager 715, a UE communications manager 815, or a UE communications manager 1015 described with reference to FIGS. 7, 8, and 10. The UE communications manager 915 may include primary cell identifier 920, secondary cell identifier 925, feedback transmitter 930, downlink message receiver 935, interference detecting component 940, and updating component 945. Each of these modules may communicate, directly or indirectly, with one another (e.g., via one or more buses).

Primary cell identifier 920 may identify a first connection with a primary cell via a first carrier having a first slot duration or a first subcarrier spacing. In some cases, the first carrier is associated with a lower frequency band than the second carrier. In some cases, the first carrier is an unlicensed carrier or a licensed carrier.

Secondary cell identifier 925 may identify a second connection with a secondary cell via a second carrier having a second slot duration that is less than the first slot duration or a second subcarrier spacing that is greater than the first subcarrier spacing. In some cases, the first carrier and the second carrier have different subcarrier spacings or slot durations. In some cases, the second carrier is a mmW carrier.

Feedback transmitter 930 may transmit feedback information for the first carrier via one or more slots of the second carrier, transmit respective feedback messages for each of the one or more downlink messages before a subsequent TxOP, and transmit respective feedback messages for each of the one or more downlink messages. In some cases, transmitting the feedback information includes: transmitting an uplink message outside of a set of symbols of the first carrier allocated for uplink transmissions. In some cases, transmitting the feedback information includes: transmitting an uplink message including CQI, an RI, beam management information, UCI, an ACK message, a NACK message, an SR message, a PMI, a RACH message, a CRI, RSRP, RSSI, or any combination thereof. In some cases, the uplink message is transmitted via PUSCH or PUCCH.

Downlink message receiver 935 may receive, from a base station, one or more downlink messages within a TxOP via the first carrier, receive, from a base station, one or more downlink messages via the first carrier, and receive, from a base station, one or more code blocks via the first carrier, where feedback information for each of the one or more code blocks is transmitted via respective sets of slots of the second carrier.

Interference detecting component 940 may detect an interference burst over one or more symbols of the first carrier and transmit a burst indication via the second carrier in response to the interference burst.

Updating component 945 may update an MCS, rank, precoder, transmission power, resource allocation, or any combination thereof for subsequent one or more symbols of the first carrier based on the burst indication and receive, in response to the burst indication, an update indication for updating the MCS of a subsequent set of symbols (e.g., for transmission via the first carrier), where the MCS for subsequent one or more symbols is updated based on the update indication. In some cases, the update indication is received via the second carrier.

Figure 10:
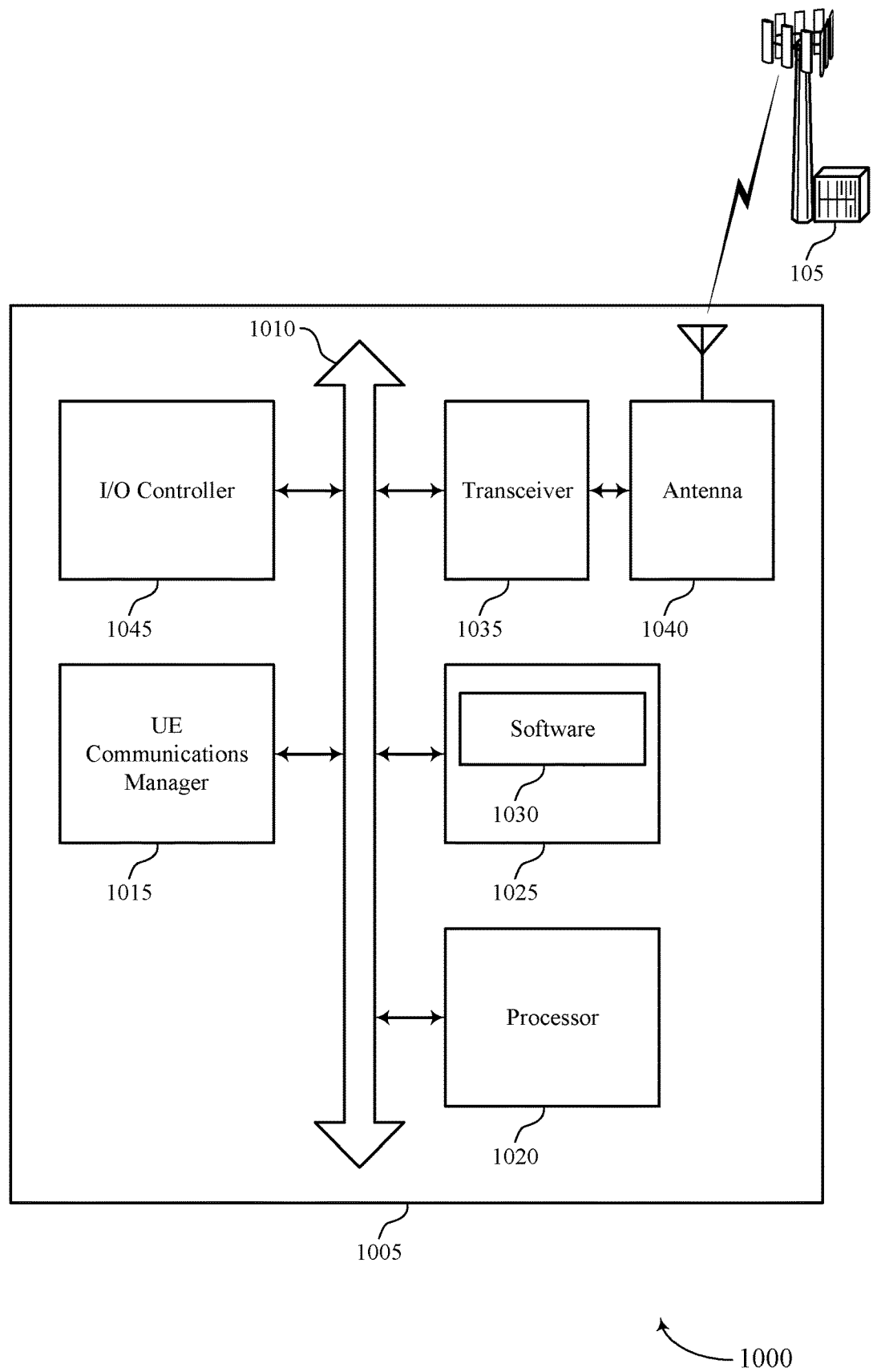
FIG. 10 illustrates a block diagram of a system including a user equipment (UE) that supports techniques for carrier feedback in wireless systems in accordance with aspects of the present disclosure.

FIG. 10 shows a diagram of a system 1000 including a device 1005 that supports techniques for carrier feedback in wireless systems in accordance with aspects of the present disclosure. Device 1005 may be an example of or include the components of wireless device 705, wireless device 805, or a UE 115 as described above, e.g., with reference to FIGS. 7 and 8. Device 1005 may include components for bi-directional voice and data communications including components for transmitting and receiving communications, including UE communications manager 1015, processor 1020, memory 1025, software 1030, transceiver 1035, antenna 1040, and I/O controller 1045. These components may be in electronic communication via one or more buses (e.g., bus 1010). Device 1005 may communicate wirelessly with one or more base stations 105.

Processor 1020 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 1020 may be configured to operate a memory array using a memory controller. In other cases, a memory controller may be integrated into processor 1020. Processor 1020 may be configured to execute computer-readable instructions stored in a memory to perform various functions (e.g., functions or tasks supporting techniques for carrier feedback in wireless systems).

Memory 1025 may include random access memory (RAM) and read only memory (ROM). The memory 1025 may store computer-readable, computer-executable software 1030 including instructions that, when executed, cause the processor to perform various functions described herein. In some cases, the memory 1025 may contain, among other things, a basic input/output system (BIOS) which may control basic hardware or software operation such as the interaction with peripheral components or devices.

Software 1030 may include code to implement aspects of the present disclosure, including code to support techniques for carrier feedback in wireless systems. Software 1030 may be stored in a non-transitory computer-readable medium such as system memory or other memory. In some cases, the software 1030 may not be directly executable by the processor but may cause a computer (e.g., when compiled and executed) to perform functions described herein.

Transceiver 1035 may communicate bi-directionally, via one or more antennas, wired, or wireless links as described above. For example, the transceiver 1035 may represent a wireless transceiver and may communicate bi-directionally with another wireless transceiver. The transceiver 1035 may also include a modem to modulate the packets and provide the modulated packets to the antennas for transmission, and to demodulate packets received from the antennas.

In some cases, the wireless device may include a single antenna 1040. However, in some cases the device may have more than one antenna 1040, which may be capable of concurrently transmitting or receiving multiple wireless transmissions.

I/O controller 1045 may manage input and output signals for device 1005. I/O controller 1045 may also manage peripherals not integrated into device 1005. In some cases, I/O controller 1045 may represent a physical connection or port to an external peripheral. In some cases, I/O controller 1045 may utilize an operating system such as iOS®, ANDROID®, MS-DOS®, MS-WINDOWS®, OS/2®, UNIX®, LINUX®, or another known operating system. In other cases, I/O controller 1045 may represent or interact with a modem, a keyboard, a mouse, a touchscreen, or a similar device. In some cases, I/O controller 1045 may be implemented as part of a processor. In some cases, a user may interact with device 1005 via I/O controller 1045 or via hardware components controlled by I/O controller 1045.

Figure 11:
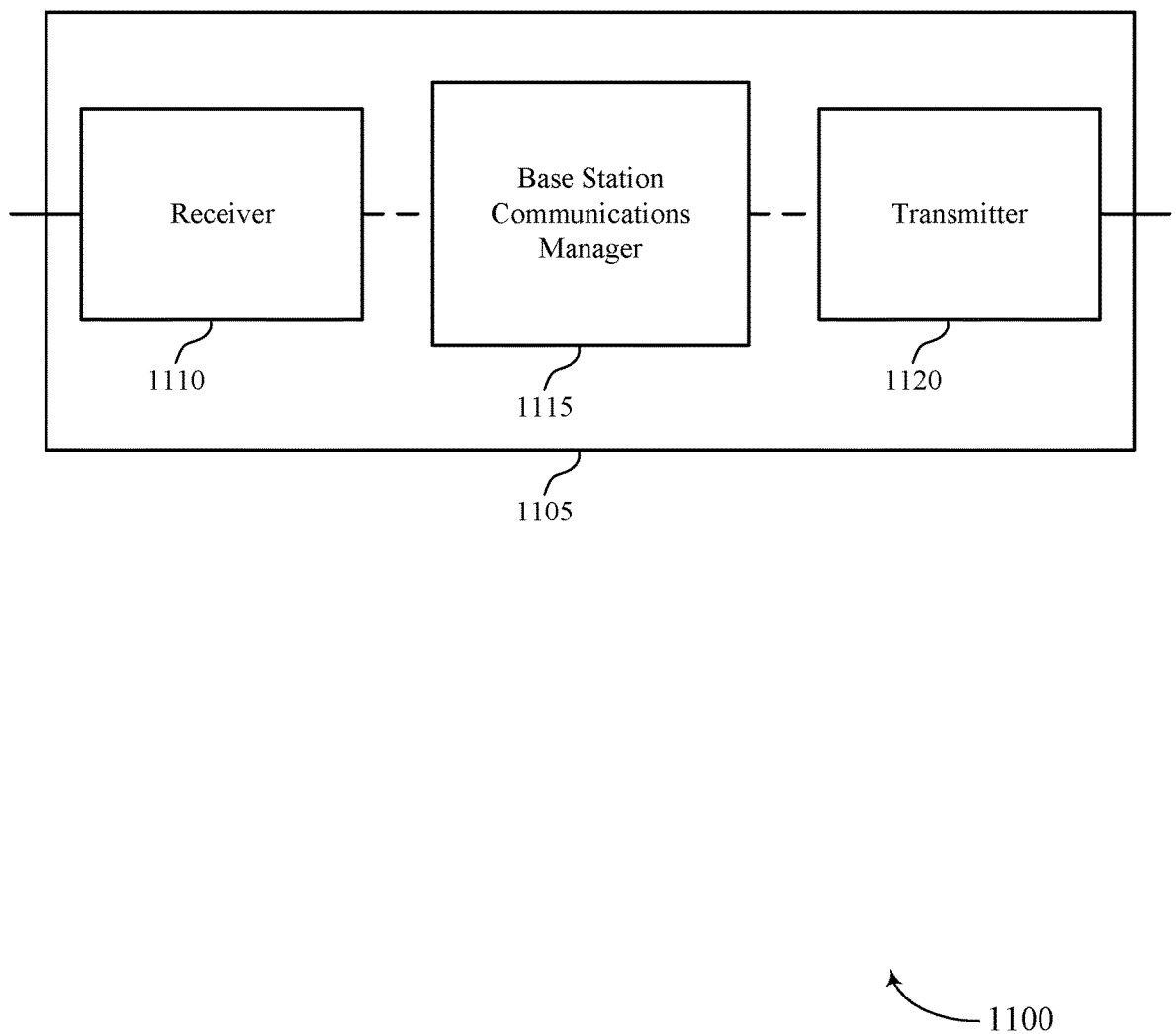
FIGS. 11 through 13 show block diagrams of a device that supports techniques for carrier feedback in wireless systems in accordance with aspects of the present disclosure.

FIG. 11 shows a block diagram 1100 of a wireless device 1105 that supports techniques for carrier feedback in wireless systems in accordance with aspects of the present disclosure. Wireless device 1105 may be an example of aspects of a base station 105 as described herein. Wireless device 1105 may include receiver 1110, base station communications manager 1115, and transmitter 1120. Wireless device 1105 may also include a processor. Each of these components may be in communication with one another (e.g., via one or more buses).

Receiver 1110 may receive information such as packets, user data, or control information associated with various information channels (e.g., control channels, data channels, and information related to techniques for carrier feedback in wireless systems, etc.). Information may be passed on to other components of the device. The receiver 1110 may be an example of aspects of the transceiver 1435 described with reference to FIG. 14. The receiver 1110 may utilize a single antenna or a set of antennas.

Base station communications manager 1115 may be an example of aspects of the base station communications manager 1415 described with reference to FIG. 14. Base station communications manager 1115 and/or at least some of its various sub-components may be implemented in hardware, software executed by a processor, firmware, or any combination thereof. If implemented in software executed by a processor, the functions of the base station communications manager 1115 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure.

The base station communications manager 1115 and/or at least some of its various sub-components may be physically located at various positions, including being distributed such that portions of functions are implemented at different physical locations by one or more physical devices. In some examples, base station communications manager 1115 and/or at least some of its various sub-components may be a separate and distinct component in accordance with various aspects of the present disclosure. In other examples, base station communications manager 1115 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Base station communications manager 1115 may identify a first connection with a UE via a first carrier having a first slot duration or a first subcarrier spacing, identify a second connection with the UE via a second carrier having a second slot duration that is less than the first slot duration or a second subcarrier spacing that is greater than the first subcarrier spacing, and receive, from the UE, feedback information for the first carrier via one or more slots of the second carrier.

Transmitter 1120 may transmit signals generated by other components of the device. In some examples, the transmitter 1120 may be collocated with a receiver 1110 in a transceiver module. For example, the transmitter 1120 may be an example of aspects of the transceiver 1435 described with reference to FIG. 14. The transmitter 1120 may utilize a single antenna or a set of antennas.

Figure 12:
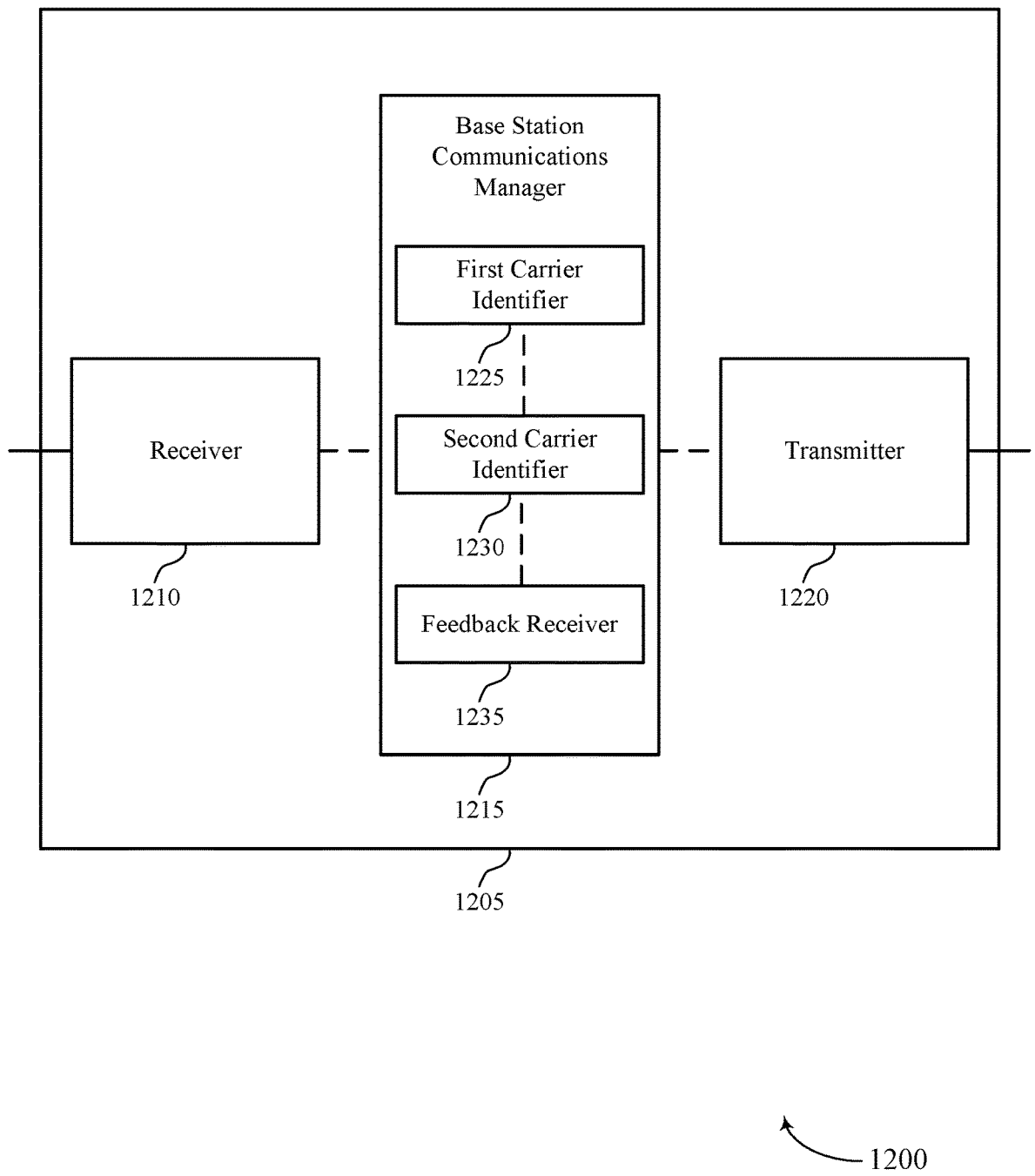

FIG. 12 shows a block diagram 1200 of a wireless device 1205 that supports techniques for carrier feedback in wireless systems in accordance with aspects of the present disclosure. Wireless device 1205 may be an example of aspects of a wireless device 1105 or a base station 105 as described with reference to FIG. 11. Wireless device 1205 may include receiver 1210, base station communications manager 1215, and transmitter 1220. Wireless device 1205 may also include a processor. Each of these components may be in communication with one another (e.g., via one or more buses).

Receiver 1210 may receive information such as packets, user data, or control information associated with various information channels (e.g., control channels, data channels, and information related to techniques for carrier feedback in wireless systems, etc.). Information may be passed on to other components of the device. The receiver 1210 may be an example of aspects of the transceiver 1435 described with reference to FIG. 14. The receiver 1210 may utilize a single antenna or a set of antennas.

Base station communications manager 1215 may be an example of aspects of the base station communications manager 1415 described with reference to FIG. 14. Base station communications manager 1215 may also include first carrier identifier 1225, second carrier identifier 1230, and feedback receiver 1235.

First carrier identifier 1225 may identify a first connection with a UE via a first carrier having a first slot duration or a first subcarrier spacing. In some cases, the first carrier and the second carrier have different subcarrier spacings or slot durations. In some cases, the first carrier is associated with a lower frequency band than the second carrier. In some cases, the first carrier is an unlicensed carrier or a licensed carrier.

Second carrier identifier 1230 may identify a second connection with the UE via a second carrier having a second slot duration that is less than the first slot duration or a second subcarrier spacing that is greater than the first subcarrier spacing. In some cases, the second carrier is an mmW carrier.

Feedback receiver 1235 may receive, from the UE, feedback information for the first carrier via one or more slots of the second carrier, receive respective feedback messages for each of the one or more downlink messages before a subsequent TxOP of the UE, and receive respective feedback messages for each of the one or more downlink messages. In some cases, receiving the feedback information includes: receiving, from the UE, an uplink message outside of a set of symbols of the first carrier allocated for uplink transmissions. In some cases, receiving the feedback information includes: receiving, from the UE, an uplink message including CQI, an RI, beam management information, UCI, an ACK message, a NACK message, an SR message, a PMI, a RACH message, a CRI, RSRP, RSSI, or any combination thereof. In some cases, the uplink message is received via PUSCH or PUCCH.

Transmitter 1220 may transmit signals generated by other components of the device. In some examples, the transmitter 1220 may be collocated with a receiver 1210 in a transceiver module. For example, the transmitter 1220 may be an example of aspects of the transceiver 1435 described with reference to FIG. 14. The transmitter 1220 may utilize a single antenna or a set of antennas.

Figure 13:
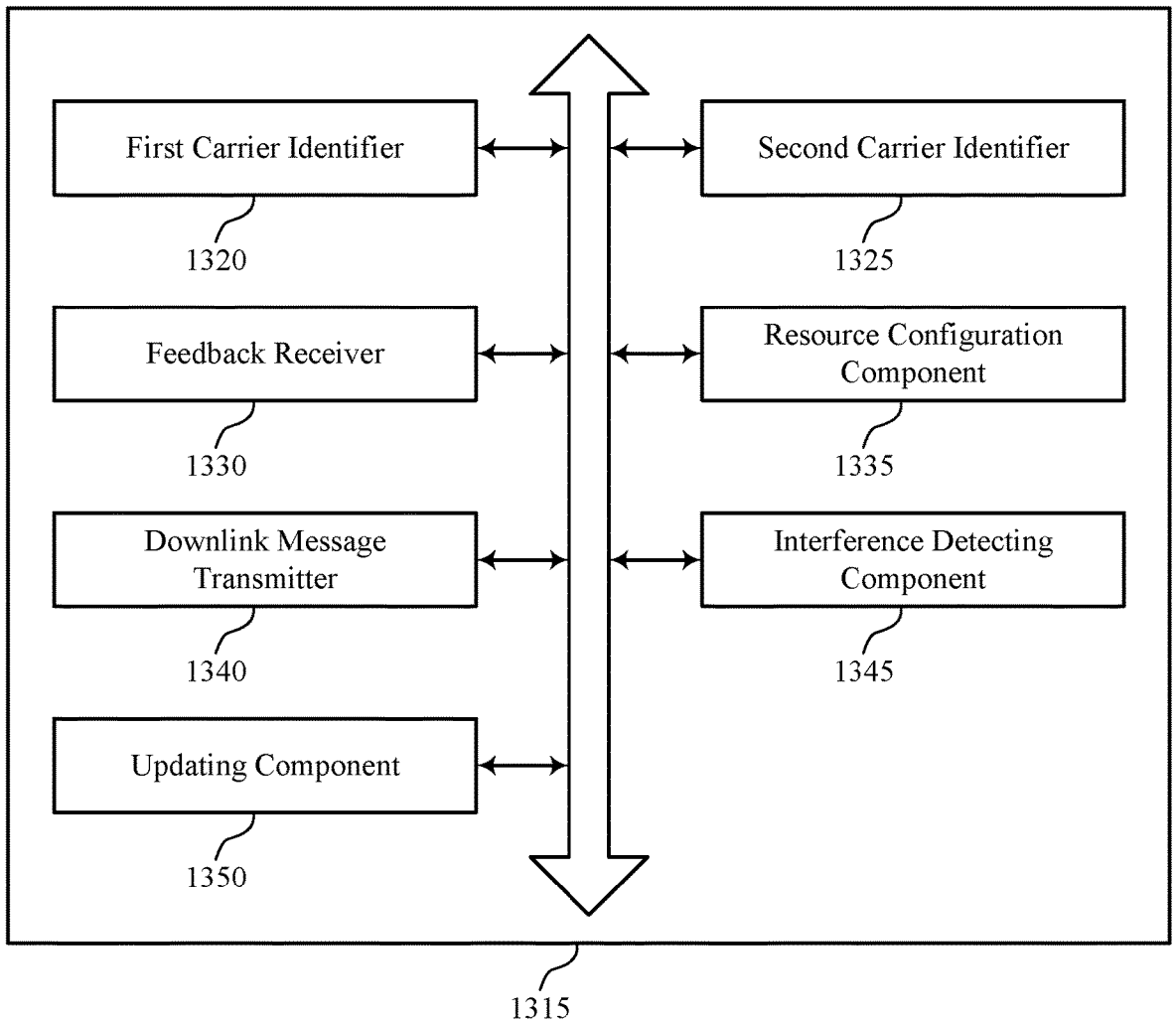

FIG. 13 shows a block diagram 1300 of a base station communications manager 1315 that supports techniques for carrier feedback in wireless systems in accordance with aspects of the present disclosure. The base station communications manager 1315 may be an example of aspects of a base station communications manager 1415 described with reference to FIGS. 11, 12, and 14. The base station communications manager 1315 may include first carrier identifier 1320, second carrier identifier 1325, feedback receiver 1330, resource configuration component 1335, downlink message transmitter 1340, interference detecting component 1345, and updating component 1350. Each of these modules may communicate, directly or indirectly, with one another (e.g., via one or more buses).

First carrier identifier 1320 may identify a first connection with a UE via a first carrier having a first slot duration or a first subcarrier spacing. In some cases, the first carrier and the second carrier have different subcarrier spacings or slot durations. In some cases, the first carrier is associated with a lower frequency band than the second carrier. In some cases, the first carrier is an unlicensed carrier or a licensed carrier.

Second carrier identifier 1325 may identify a second connection with the UE via a second carrier having a second slot duration that is less than the first slot duration or a second subcarrier spacing that is greater than the first subcarrier spacing. In some cases, the second carrier is an mmW carrier.

Feedback receiver 1330 may receive, from the UE, feedback information for the first carrier via one or more slots of the second carrier, receive respective feedback messages for each of the one or more downlink messages before a subsequent TxOP of the UE, and receive respective feedback messages for each of the one or more downlink messages. In some cases, receiving the feedback information includes: receiving, from the UE, an uplink message outside of a set of symbols of the first carrier allocated for uplink transmissions. In some cases, receiving the feedback information includes: receiving, from the UE, an uplink message including CQI, an RI, beam management information, UCI, an ACK message, a NACK message, an SR message, a PMI, a RACH message, a CRI, RSRP, RSSI, or any combination thereof. In some cases, the uplink message is received via PUSCH or PUCCH.

Resource configuration component 1335 may configure a set of time-frequency resources of the second carrier for feedback information, where the feedback information is received via the configured set of time-frequency resources and transmit, to the UE, an indication of the configured set of time-frequency resources. In some cases, the set of time-frequency resources are configured based on a capability of the UE, the first slot duration, the second slot duration, the first subcarrier spacing, the second subcarrier spacing, or any combination thereof.

Downlink message transmitter 1340 may transmit one or more downlink messages within a TxOP of the UE, transmit one or more downlink messages, and transmit, to the UE, one or more code blocks via the first carrier, where feedback information for each of the one or more code blocks is received via respective sets of slots of the second carrier.

Interference detecting component 1345 may receive, from the UE, a burst indication via the second carrier based on an interference burst associated to the first carrier and determine a modulation and coding scheme (MCS), rank, precoder, transmission power, resource allocation, or any combination thereof a subsequent set of symbols based on the burst indication.

Updating component 1350 may transmit, in response to the burst indication, an update indication that includes the MCS, rank, precoder, transmission power, resource allocation, or any combination thereof the subsequent set of symbols.

Figure 14:
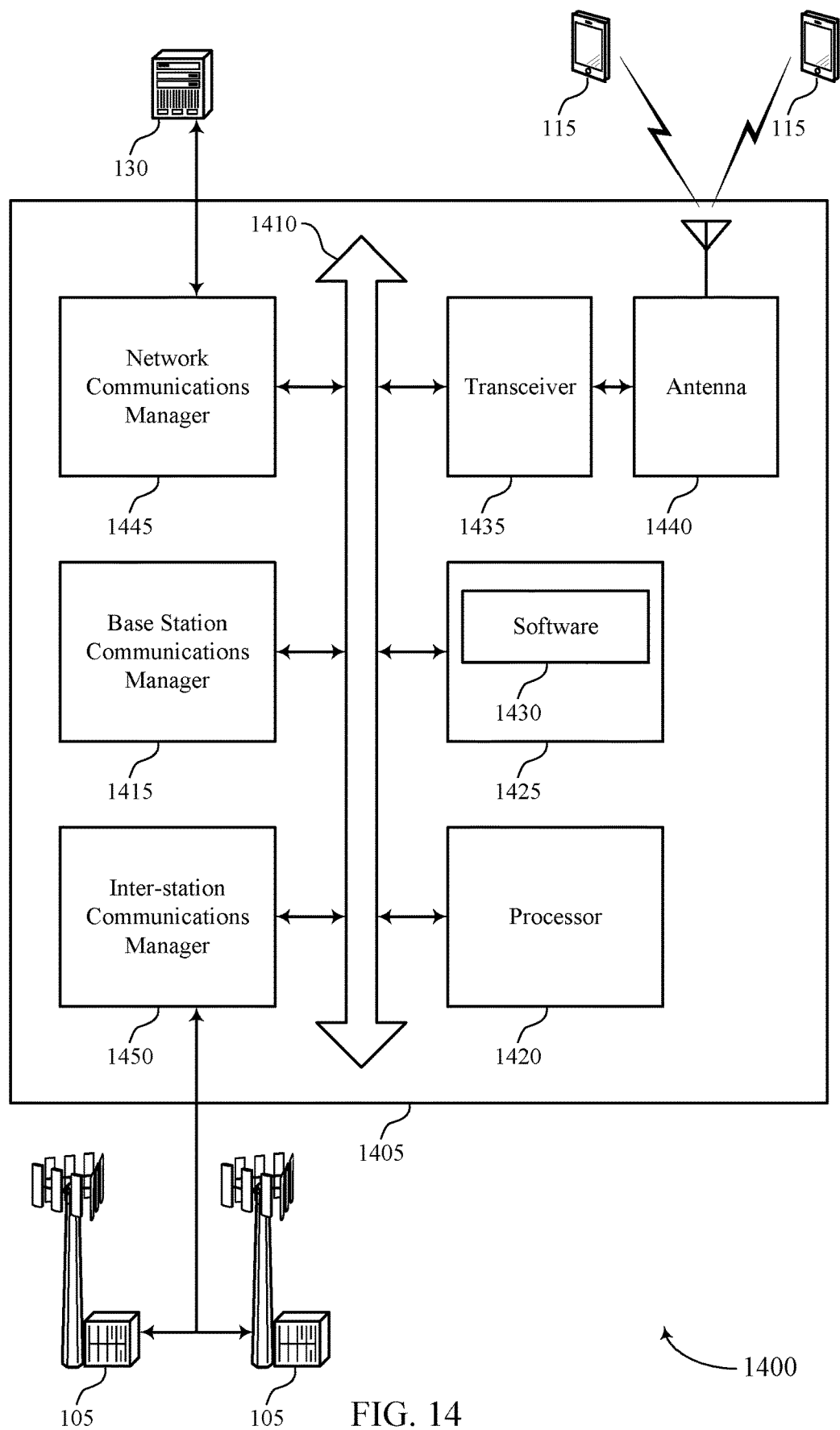
FIG. 14 illustrates a block diagram of a system including a base station that supports techniques for carrier feedback in wireless systems in accordance with aspects of the present disclosure.

FIG. 14 shows a diagram of a system 1400 including a device 1405 that supports techniques for carrier feedback in wireless systems in accordance with aspects of the present disclosure. Device 1405 may be an example of or include the components of base station 105 as described above, e.g., with reference to FIG. 1. Device 1405 may include components for bi-directional voice and data communications including components for transmitting and receiving communications, including base station communications manager 1415, processor 1420, memory 1425, software 1430, transceiver 1435, antenna 1440, network communications manager 1445, and inter-station communications manager 1450. These components may be in electronic communication via one or more buses (e.g., bus 1410). Device 1405 may communicate wirelessly with one or more UEs 115.

Processor 1420 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1420 may be configured to operate a memory array using a memory controller. In other cases, a memory controller may be integrated into processor 1420. Processor 1420 may be configured to execute computer-readable instructions stored in a memory to perform various functions (e.g., functions or tasks supporting techniques for carrier feedback in wireless systems).

Memory 1425 may include RAM and ROM. The memory 1425 may store computer-readable, computer-executable software 1430 including instructions that, when executed, cause the processor to perform various functions described herein. In some cases, the memory 1425 may contain, among other things, a BIOS which may control basic hardware or software operation such as the interaction with peripheral components or devices.

Software 1430 may include code to implement aspects of the present disclosure, including code to support techniques for carrier feedback in wireless systems. Software 1430 may be stored in a non-transitory computer-readable medium such as system memory or other memory. In some cases, the software 1430 may not be directly executable by the processor but may cause a computer (e.g., when compiled and executed) to perform functions described herein.

Transceiver 1435 may communicate bi-directionally, via one or more antennas, wired, or wireless links as described above. For example, the transceiver 1435 may represent a wireless transceiver and may communicate bi-directionally with another wireless transceiver. The transceiver 1435 may also include a modem to modulate the packets and provide the modulated packets to the antennas for transmission, and to demodulate packets received from the antennas.

In some cases, the wireless device may include a single antenna 1440. However, in some cases the device may have more than one antenna 1440, which may be capable of concurrently transmitting or receiving multiple wireless transmissions.

Network communications manager 1445 may manage communications with the core network (e.g., via one or more wired backhaul links). For example, the network communications manager 1445 may manage the transfer of data communications for client devices, such as one or more UEs 115.

Inter-station communications manager 1450 may manage communications with other base station 105, and may include a controller or scheduler for controlling communications with UEs 115 in cooperation with other base stations 105. For example, the inter-station communications manager 1450 may coordinate scheduling for transmissions to UEs 115 for various interference mitigation techniques such as beamforming or joint transmission. In some examples, inter-station communications manager 1450 may provide an X2 interface within an Long Term Evolution (LTE)/LTE-A wireless communication network technology to provide communication between base stations 105.

Figure 15:
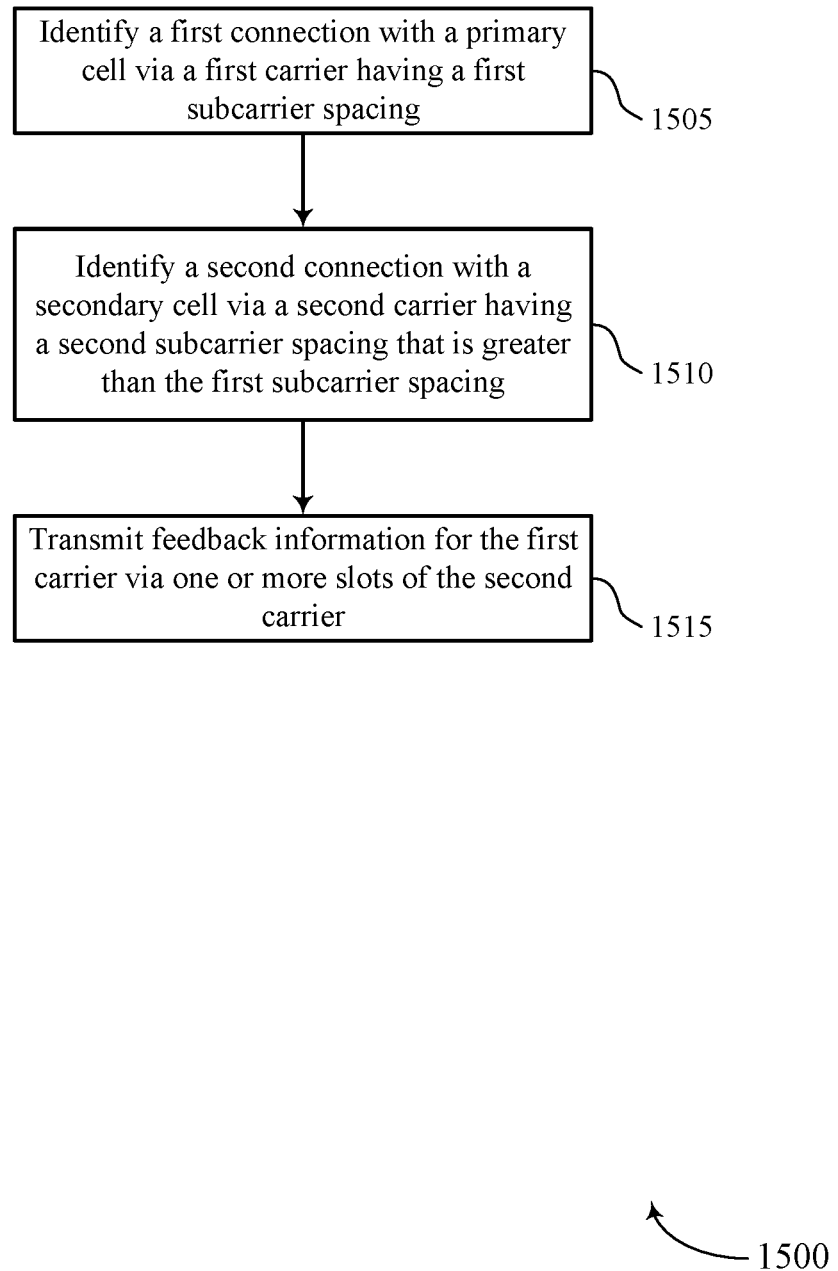
FIGS. 15 through 16 illustrate methods for techniques for carrier feedback in wireless systems in accordance with aspects of the present disclosure.

FIG. 15 shows a flowchart illustrating a method 1500 for techniques for carrier feedback in wireless systems in accordance with aspects of the present disclosure. The operations of method 1500 may be implemented by a UE 115 or its components as described herein. For example, the operations of method 1500 may be performed by a UE communications manager as described with reference to FIGS. 7 through 10. In some examples, a UE 115 may execute a set of codes to control the functional elements of the device to perform the functions described below. Additionally or alternatively, the UE 115 may perform aspects of the functions described below using special-purpose hardware.

At 1505 the UE 115 may identify a first connection with a primary cell via a first carrier having a first subcarrier spacing. The operations of 1505 may be performed according to the methods described herein. In certain examples, aspects of the operations of 1505 may be performed by a primary cell identifier as described with reference to FIGS. 7 through 10.

At 1510 the UE 115 may identify a second connection with a secondary cell via a second carrier having a second subcarrier spacing that is greater than the first subcarrier spacing. The operations of 1510 may be performed according to the methods described herein. In certain examples, aspects of the operations of 1510 may be performed by a secondary cell identifier as described with reference to FIGS. 7 through 10.

At 1515 the UE 115 may transmit feedback information for the first carrier via one or more slots of the second carrier. The operations of 1515 may be performed according to the methods described herein. In certain examples, aspects of the operations of 1515 may be performed by a feedback transmitter as described with reference to FIGS. 7 through 10.

Figure 16:
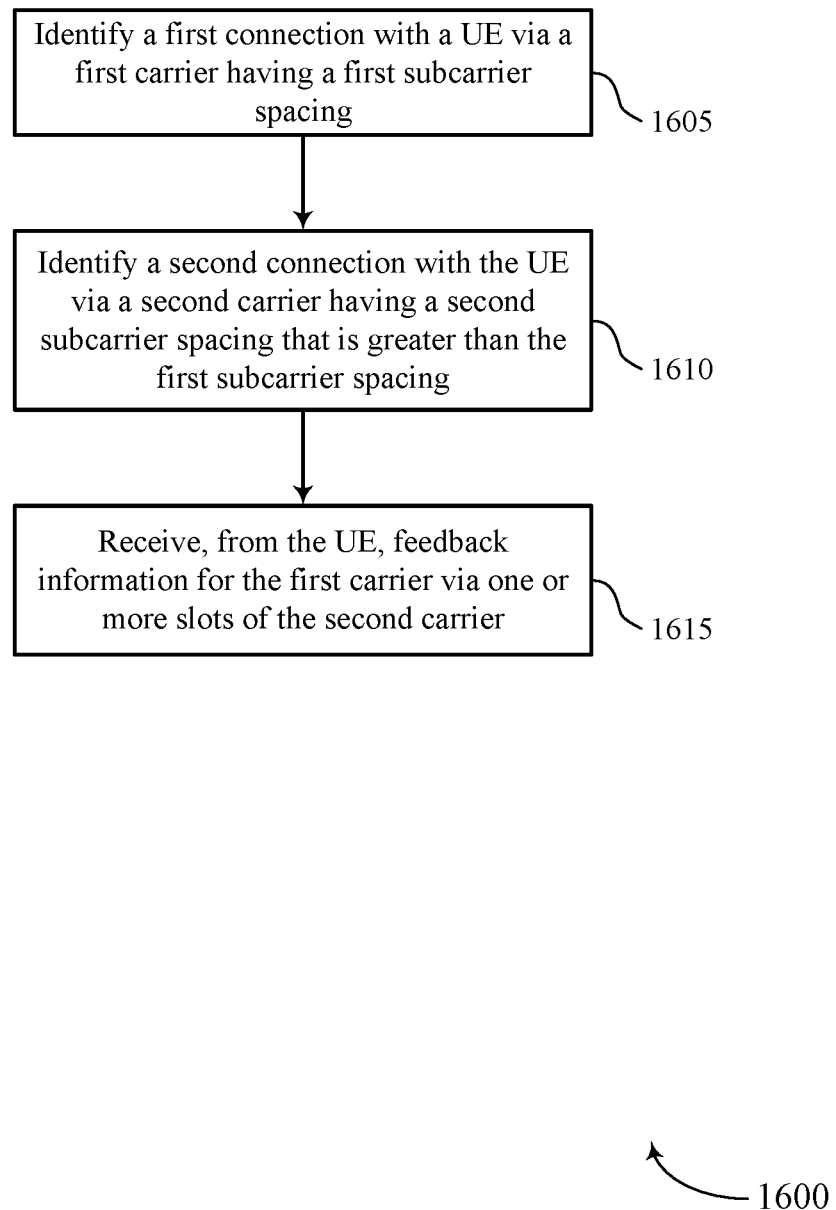

FIG. 16 shows a flowchart illustrating a method 1600 for techniques for carrier feedback in wireless systems in accordance with aspects of the present disclosure. The operations of method 1600 may be implemented by a base station 105 or its components as described herein. For example, the operations of method 1600 may be performed by a base station communications manager as described with reference to FIGS. 11 through 14. In some examples, a base station 105 may execute a set of codes to control the functional elements of the device to perform the functions described below. Additionally or alternatively, the base station 105 may perform aspects of the functions described below using special-purpose hardware.

At 1605 the base station 105 may identify a first connection with a UE via a first carrier having a first subcarrier spacing. The operations of 1605 may be performed according to the methods described herein. In certain examples, aspects of the operations of 1605 may be performed by a first carrier identifier as described with reference to FIGS. 11 through 14.

At 1610 the base station 105 may identify a second connection with the UE via a second carrier having a second subcarrier spacing that is greater than the first subcarrier spacing. The operations of 1610 may be performed according to the methods described herein. In certain examples, aspects of the operations of 1610 may be performed by a second carrier identifier as described with reference to FIGS. 11 through 14.

At 1615 the base station 105 may receive, from the UE, feedback information for the first carrier via one or more slots of the second carrier. The operations of 1615 may be performed according to the methods described herein. In certain examples, aspects of the operations of 1615 may be performed by a feedback receiver as described with reference to FIGS. 11 through 14.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple CCs.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
    identifying a first connection with a primary cell via a first carrier having a first subcarrier spacing;
    identifying a second connection with a secondary cell via a second carrier having a second subcarrier spacing that is greater than the first subcarrier spacing;
    detecting interference on the first carrier;
    transmitting, via one or more slots of the second carrier, feedback information for the first carrier including an indication of the detected interference on the first carrier; and
    updating a modulation and coding scheme (MCS), rank, precoder, transmission power, resource allocation, or any combination thereof for a subsequent one or more symbols of the first carrier based at least in part on transmission of the indication of the detected interference via the one or more slots of the second carrier.

2. The method of claim 1, wherein transmitting the feedback information comprises:
transmitting an uplink message outside of a set of symbols of the first carrier allocated for uplink transmissions.

3. The method of claim 1, further comprising:
receiving, from a base station, one or more downlink messages within a transmission opportunity (TxOP) via the first carrier; and
transmitting respective feedback messages for each of the one or more downlink messages before a subsequent TxOP via the first carrier.

4. The method of claim 1, further comprising:
receiving, from a base station, one or more downlink messages via the first carrier; and
transmitting respective feedback messages for each of the one or more downlink messages via the one or more slots of the second carrier.

5. The method of claim 1, further comprising:
receiving, from a base station, one or more code blocks via the first carrier, wherein feedback information for each of the one or more code blocks is transmitted via respective sets of slots of the second carrier.

6. The method of claim 1, further comprising:
detecting an interference burst over one or more symbols of the first carrier; and
transmitting a burst indication via the second carrier in response to detecting the interference burst.

7. The method of claim 6, further comprising:
receiving, in response to the burst indication, an update indication for updating the MCS of the subsequent one or more symbols for transmission via the first carrier, wherein the MCS for the subsequent one or more symbols is updated based at least in part on the update indication, and wherein the update indication is received via the second carrier.

8. The method of claim 1, wherein transmitting the feedback information comprises:
transmitting an uplink message comprising channel quality indicator (CQI), a rank indicator (RI), beam management information, uplink control information (UCI), an acknowledgement (ACK) message, a negative ACK (HACK) message, a scheduling request (SR) message, a precoding matrix indicator (PMI), a random access channel (RACH) message, a channel state information reference signal resource indicator (CRI), reference signal received power (RSRP), received signal strength indicator (RSSI), or any combination thereof.

9. The method of claim 8, wherein the uplink message is transmitted via a physical uplink shared channel (PUSCH) or a physical uplink control channel (PUCCH).

10. The method of claim 1, wherein the first carrier and the second carrier have different slot durations.

11. The method of claim 1, wherein the first carrier is associated with a lower frequency band than the second carrier.

12. The method of claim 1, wherein the first carrier is an unlicensed carrier or a licensed carrier.

13. The method of claim 1, wherein the second carrier is a millimeter wave (mmW) carrier.

14. A method for wireless communication, comprising:
identifying a first connection with a user equipment (UE) via a first carrier having a first subcarrier spacing;
identifying a second connection with the UE via a second carrier having a second subcarrier spacing that is greater than the first subcarrier spacing;
receiving, from the UE via one or more slots of the second carrier, feedback information for the first carrier including an indication of interference on the first carrier detected by the UE;
determining, based at least in part on the indication of the interference on the first carrier received via the one or more slots of the second carrier, a modulation and coding scheme (MCS), rank, precoder, transmission power, resource allocation, or any combination thereof for a subsequent set of symbols of the first carrier; and
transmitting, in response to the indication of the interference on the first carrier received via the one or more slots of the second carrier, an update indication that comprises the MCS, rank, precoder, transmission power, resource allocation, or any combination thereof for the subsequent set of symbols of the first carrier.

15. The method of claim 14, further comprising:
configuring a set of time-frequency resources of the second carrier for feedback information, wherein the feedback information is received via the configured set of time-frequency resources.

16. The method of claim 15, further comprising:
transmitting, to the UE, an indication of the configured set of time-frequency resources.

17. The method of claim 15, wherein the set of time-frequency resources are configured based at least in part on a capability of the UE, the first subcarrier spacing, the second subcarrier spacing, or any combination thereof.

18. The method of claim 14, wherein receiving the feedback information comprises:
receiving, from the UE, an uplink message outside of a set of symbols of the first carrier allocated for uplink transmissions.

19. The method of claim 14, further comprising:
transmitting one or more downlink messages within a transmission opportunity (TxOP) of the UE; and
receiving respective feedback messages for each of the one or more downlink messages before a subsequent TxOP of the UE via the first carrier.

20. The method of claim 14, further comprising:
transmitting one or more downlink messages; and
receiving respective feedback messages for each of the one or more downlink messages via the one or more slots of the second carrier.

21. The method of claim 14, further comprising:
transmitting, to the UE, one or more code blocks via the first carrier, wherein feedback information for each of the one or more code blocks is received via respective sets of slots of the second carrier.

22. The method of claim 14, further comprising:
receiving, from the UE, a burst indication via the second carrier based at least in part on an interference burst associated to the first carrier;
determining the MCS, rank, precoder, transmission power, resource allocation, or any combination thereof for the subsequent set of symbols based at least in part on the burst indication.

23. The method of claim 14, wherein receiving the feedback information comprises:
receiving, from the UE, an uplink message comprising channel quality indicator (CQI), a rank indicator (RI), beam management information, uplink control information (UCI), an acknowledgement (ACK) message, a negative ACK (NACK) message, a scheduling request (SR) message, a precoding matrix indicator (PMI), a random access channel (RACH) message, a channel state information reference signal resource indicator (CRI), reference signal received power (RSRP), received signal strength indicator (RSSI), or any combination thereof.

24. The method of claim 23, wherein the uplink message is received via a physical uplink shared channel (PUSCH) or a physical uplink control channel (PUCCH).

25. The method of claim 14, wherein the first carrier and the second carrier have different slot durations.

26. The method of claim 14, wherein the first carrier is associated with a lower frequency band than the second carrier.

27. The method of claim 14, wherein the first carrier is an unlicensed carrier or a licensed carrier.

28. The method of claim 14, wherein the second carrier is a millimeter wave (mmW) carrier.

29. An apparatus for wireless communication, comprising:
a processor;
memory coupled with the processor; and
instructions stored in the memory and executable by the processor to cause the apparatus to:
identify a first connection with a primary cell via a first carrier having a first subcarrier spacing;
identify a second connection with a secondary cell via a second carrier having a second subcarrier spacing that is greater than the first subcarrier spacing;
detect interference on the first carrier;
transmit, via one or more slots of the second carrier, feedback information for the first carrier including an indication of the detected interference on the first carrier; and
update a modulation and coding scheme (MCS), rank, precoder, transmission power, resource allocation, or any combination thereof for a subsequent one or more symbols of the first carrier based at least in part on transmission of the indication of the detected interference via the one or more slots of the second carrier.

30. An apparatus for wireless communication, comprising:
a processor;
memory coupled with the processor; and
instructions stored in the memory and executable by the processor to cause the apparatus to:
identify a first connection with a user equipment (UE) via a first carrier having a first subcarrier spacing;
identify a second connection with the UE via a second carrier having a second subcarrier spacing that is greater than the first subcarrier spacing;
receive, from the UE via one or more slots of the second carrier, feedback information for the first carrier including an indication of interference on the first carrier detected by the UE;
determine, based at least in part on the indication of the interference on the first carrier received via the one or more slots of the second carrier, a modulation and coding scheme (MCS), rank, precoder, transmission power, resource allocation, or any combination thereof for a subsequent set of symbols of the first carrier; and
transmit, in response to the indication of the interference on the first carrier received via the one or more slots of the second carrier, an update indication that comprises the MCS, rank, precoder, transmission power, resource allocation, or any combination thereof for the subsequent set of symbols of the first carrier.

* * * * *